US010885058B2

(12) United States Patent
Andritsos

(10) Patent No.: US 10,885,058 B2
(45) Date of Patent: Jan. 5, 2021

(54) DATA VISUALIZATION PLATFORM FOR EVENT-BASED BEHAVIOR CLUSTERING

(71) Applicant: ODAIA Intelligence Inc., Toronto (CA)

(72) Inventor: Periklis Andritsos, Toronto (CA)

(73) Assignee: ODAIA Intelligence Inc., Toronto (CA)

( * ) Notice: Subject to any disclaimer, the term of this patent is extended or adjusted under 35 U.S.C. 154(b) by 0 days.

(21) Appl. No.: 16/005,069

(22) Filed: Jun. 11, 2018

(65) Prior Publication Data
US 2019/0377818 A1 Dec. 12, 2019

(51) Int. Cl.
G06F 16/26 (2019.01)
G06F 16/28 (2019.01)
G06F 16/2458 (2019.01)

(52) U.S. Cl.
CPC .......... G06F 16/26 (2019.01); G06F 16/2465 (2019.01); G06F 16/287 (2019.01); G06F 16/288 (2019.01)

(58) Field of Classification Search
CPC ......... G06F 17/30572; G06F 17/30539; G06F 17/30601
USPC ......................................................... 707/738
See application file for complete search history.

(56) References Cited

U.S. PATENT DOCUMENTS

| 8,972,177 | B2 * | 3/2015 | Zheng | G06Q 10/10 |
| | | | | 701/454 |
| 9,128,995 | B1 * | 9/2015 | Fletcher | G06F 17/30572 |
| 9,275,359 | B1 | 3/2016 | Fomin et al. | |
| 9,324,038 | B2 | 4/2016 | Charif et al. | |
| 9,418,339 | B1 * | 8/2016 | Leonard | G06F 17/18 |
| 9,746,985 | B1 * | 8/2017 | Humayun | G06Q 10/10 |
| 2008/0250357 | A1 * | 10/2008 | Lee | G06F 17/2211 |
| | | | | 715/853 |
| 2012/0102396 | A1 * | 4/2012 | Arksey | G06T 11/206 |
| | | | | 715/273 |
| 2012/0221589 | A1 * | 8/2012 | Shahar | G06F 17/30551 |
| | | | | 707/758 |
| 2013/0332241 | A1 * | 12/2013 | Taylor | G06F 16/283 |
| | | | | 705/7.36 |
| 2014/0058789 | A1 | 2/2014 | Doehring et al. | |

(Continued)

OTHER PUBLICATIONS

Bernard, G., Andritsos, P.; A Process Mining Based Model for Customer Journey Mapping; Proceedings of the Forum and Doctoral Consortium Papers Presented at the 29th International Conference on Advanced Information Systems Engineering (CAiSE 2017); Jun. 2017.

(Continued)

Primary Examiner — Hosain T Alam
Assistant Examiner — Nicholas E Allen
(74) Attorney, Agent, or Firm — Bereskin & Parr LLP/S.E.N.C.R.L., s.r.l.; Isis E. Caulder

(57) ABSTRACT

A platform for processing event traces to generate clusters of journey maps for an interactive user display. The clustering can be implemented using a genetic process. The clustering can be implemented using a distance measures. Other clustering techniques can be used. The platform can use the clustering results to generate interactive dynamic visualizations with interactive selectable portions. The platform can integrate processing mining and journey maps to generate interactive dynamic visualizations.

20 Claims, 33 Drawing Sheets

(56) References Cited

U.S. PATENT DOCUMENTS

| | | | | |
|---|---|---|---|---|
| 2015/0254594 A1* | 9/2015 | Kittur | ............ | G06Q 10/06398 705/7.42 |
| 2015/0262077 A1* | 9/2015 | White | ................... | G06N 20/00 706/12 |
| 2015/0295778 A1* | 10/2015 | Hsiao | ................ | H04L 43/0894 715/736 |
| 2015/0317337 A1* | 11/2015 | Edgar | .................... | G06F 17/30 707/751 |
| 2015/0324391 A1* | 11/2015 | Werner | ............ | G06F 17/30572 707/722 |
| 2016/0253681 A1* | 9/2016 | de Souza | ............... | G06F 16/26 705/13 |
| 2017/0061659 A1* | 3/2017 | Puri | ................. | G06F 17/30345 |
| 2017/0111245 A1 | 4/2017 | Ishakian et al. | | |
| 2017/0287179 A1* | 10/2017 | Tibshirani | ............ | G06T 11/206 |
| 2018/0089278 A1* | 3/2018 | Bhattacharjee | ....... | G06F 16/951 |
| 2018/0095938 A1* | 4/2018 | Monte | .................. | G06F 3/0484 |
| 2018/0096052 A1* | 4/2018 | M | ......................... | G06F 3/0482 |
| 2018/0121035 A1* | 5/2018 | Filippi | ............... | G06F 11/3089 |
| 2018/0121566 A1* | 5/2018 | Filippi | ............. | G06F 17/30991 |

OTHER PUBLICATIONS

Bernard, G., Andritsos, P.; CJM-ex: Goal-oriented Exploration of Customer Journey Maps using Event Logs and Data Analytics; 15th International Conference on Business Process Management (BPM2017); Sep. 2017.

Harbich, M., Bernard, G., Berkes, P., Garbinato, B., Andritsos, P.; Discovering Customer Journey Maps using a Mixture of Markov Models; IFIP 2.6 Symposium on Data-Driven Process Discovery and Analysis (SIMPDA 2017); Dec. 2017.

International Search Report and Written Opinion dated Aug. 15, 2019 in corresponding International Patent Application No. PCT/CA2019/050823 (12 pages).

\* cited by examiner

DATA VISUALIZATION PLATFORM FOR EVENT-BASED BEHAVIOR CLUSTERING

FIELD

The present disclosure generally relates to the field of data visualization, machine learning, cluster analysis, and computer interfaces.

INTRODUCTION

Embodiments described herein relate to a data visualization for event-based behavior analysis or trace analysis. Machine learning is a field of computer science that involves programming code configured to learn, adapt or improve performance on a specific task with data, without being explicitly programmed. Cluster analysis can involve code that processes input data to group a set of objects in clusters based on detected patterns or similarities. That is, objects grouped in a cluster are more similar (in some sense) to each other than to those in other clusters. Machine learning can involve cluster analysis to learn patterns and similarities when processing input data. Machine learning and cluster analysis can generate output data that can be used to create dynamic, interactive visual elements for computer interfaces. The computer interfaces can receive control commands that can be received as input data and trigger generation of updated visual elements.

SUMMARY

In accordance with an aspect, there is provided a platform for processing event traces to generate clusters of the event traces for an interactive user display.

In various further aspects, the disclosure provides corresponding systems and devices, and logic structures such as machine-executable coded instruction sets for implementing such systems, devices, and methods.

In accordance with an aspect, there is provided a platform with data storage device having a data warehouse model for storing event traces, each event trace having attributes that indicate activities over time. The platform has a processor configured to process machine executable instructions to generate visual elements for an interactive interface application by: generating hierarchical cluster for the event traces by grouping event traces having similar attributes; generating a set of representative attributes for a set of event traces of the hierarchical cluster, the set of representative attributes computed based on the similar attributes; generating the visual elements for multiple views for the interface application, the multiple views having a first view indicating a pattern of activities for the set of representative attributes; a second view indicating the hierarchical cluster and the pattern of activities within the hierarchical cluster; and a third view indicating descriptors for the hierarchical cluster, the multiple views having a plurality of selectable portions; controlling rendering of the interface application at a device to display the multiple views synchronously; and responsive to a selection of a selectable portion of the plurality of selectable portions, controlling rendering of the interface application at the device to update the multiple views synchronously based on the selected portion to navigate the hierarchical cluster.

In some embodiments, the processor generates the hierarchical cluster by computing a distance measure for the attributes of the event traces to compute the similar attributes.

In some embodiments, the processor generates the hierarchical cluster by computing a distance measure based on a Levenshtein distance.

In some embodiments, the processor generates the hierarchical cluster by computing a distance between clusters of the hierarchical cluster.

In some embodiments, the pattern of activities indicates the set of representative attributes for a segment of the hierarchical cluster that corresponds to the set of event traces.

In some embodiments, the second view indicates the segment of the hierarchical cluster for the pattern of activities indicated in the first view.

In some embodiments, the selection portion is within a view of the multiple views to trigger an update to the other views of the multiple views.

In some embodiments, the processor updates the multiple views synchronously based on the selected portion to navigate the hierarchical cluster at different levels of abstraction or granularity.

In some embodiments, the processor generates the hierarchical cluster based on a proximity measure using an order of activities for the event traces.

In some embodiments, the processor computes salient characteristics for the descriptors to indicate indexes based on a chi-square test.

In some embodiments, the processor receives a navigation goal at the interface application, the goal indicating an attribute and responsive to the navigation goal, controlling rendering of the interface application at the device to update the multiple views synchronously to indicate data based on the navigation goal.

In some embodiments, the processor generates the hierarchical cluster based on layers, a layer corresponding to a number of event traces that will be grouped based on the similar attributes, the layers corresponding to a height of the hierarchical cluster.

In some embodiments, the processor generates the set of representative attributes based on the similar attributes and a frequent sequences mining process.

In accordance with an aspect, there is provided a non-transitory computer readable medium storing machine executable instructions to configure a processor to: generate hierarchical cluster for the event traces by grouping event traces having similar attributes, each event trace having attributes that indicate activities over time; generate a set of representative attributes for a set of event traces of the hierarchical cluster, the set of representative attributes computed based on the similar attributes; generate the visual elements for multiple views for the interface application, the multiple views having a first view indicating a pattern of activities for the set of representative attributes; a second view indicating the hierarchical cluster and the pattern of activities within the hierarchical cluster; and a third view indicating descriptors for the hierarchical cluster, the multiple views having a plurality of selectable portions; control rendering of the interface application at a device to display the multiple views synchronously; and responsive to a selection of a selectable portion of the plurality of selectable portions, control rendering of the interface application at the device to update the multiple views synchronously based on the selected portion to navigate the hierarchical cluster.

In some embodiments, the machine executable instructions configure the processor to generate the hierarchical cluster by computing a distance measure for the attributes of the event traces to compute the similar attributes.

In some embodiments, the machine executable instructions configure the processor to generate the hierarchical cluster by computing a distance between clusters of the hierarchical cluster.

In some embodiments, the machine executable instructions configure the processor to update the multiple views synchronously based on the selected portion to navigate the hierarchical cluster at different levels of abstraction or granularity.

In some embodiments, the machine executable instructions configure the processor to receive a navigation goal at the interface application, the goal indicating an attribute and responsive to the navigation goal, controlling rendering of the interface application at the device to update the multiple views synchronously to indicate data based on the navigation goal.

In some embodiments, the machine executable instructions configure the processor to generate the hierarchical cluster based on layers, a layer corresponding to a number of event traces that will be grouped based on the similar attributes, the layers corresponding to a height of the hierarchical cluster.

In accordance with an aspect, there is provided a computer process to generate visual elements for an interactive interface application. The process involves, at a processor, generating hierarchical cluster for the event traces by grouping event traces based on distance measures, each event trace having attributes that indicate activities over time, generating a set of representative attributes for a set of event traces of the hierarchical cluster, the set of representative attributes computed based on the grouped event traces; generating the visual elements for multiple views for the interface application, the multiple views having a first view indicating a pattern of activities for the set of representative attributes; a second view indicating the hierarchical cluster and the pattern of activities within the hierarchical cluster; and a third view indicating descriptors for the hierarchical cluster, the multiple views having a plurality of selectable portions; controlling rendering of the interface application at a device to display the multiple views synchronously; and responsive to a selection of a selectable portion of the plurality of selectable portions, controlling rendering of the interface application at the device to update the multiple views synchronously based on the selected portion, wherein the selection portion is within a view of the multiple views to trigger an update to the other views of the multiple views.

In accordance with an aspect, there is provided a platform with a data storage device for storing event traces, the event traces having attributes that indicate activities over time. The platform has a processor configured to process machine executable instructions to generate visual elements for an interactive interface application by: computing clusters of the event traces based on a genetic process function, each cluster corresponding to a set of event traces and a representative event trace based on representative attributes of the set of event traces, the genetic process function mapping each event trace to a cluster; generating the visual elements for an interface application, the visual elements indicating the clusters and, for each cluster, the representative event trace based on the representative attributes, the representative event trace summarizing the set of event traces corresponding to the cluster; controlling rendering of the interface application at a device to display the visual elements and a plurality of selectable portions; and responsive to a selection of a selectable portion of the plurality of selectable portions, controlling rendering of the interface application at the device to navigate the clusters.

In some embodiments, the processor is configured to implement the genetic process function by: evaluating initial set representative event traces to generate elite set representative event traces, generating additional initial representative event traces using a transformation process, evaluating the additional initial representative event traces to generate additional elite set representative event traces, continuing the generating and the evaluating until stopping criterion is met, using resulting elite representative event traces as the representative event traces for the clusters.

In some embodiments, for each event trace, the attributes are represented as a two-dimensional tuple of activities over time and contextual data and the genetic process function can evaluate the two-dimensional tuples of the event traces.

In some embodiments, the processor computes, for each cluster, the representative event trace as a pattern of activities to summarize the patterns contained within the set of event traces of the cluster.

In some embodiments, the processor implements the genetic process function by pre-processing the event traces, determining an initial population that corresponds to a number of the clusters, evaluating initial representative event traces, evaluating stop criteria, implementing a genetic operation to generate additional initial representative event traces, outputting a map abstraction for use in generating additional visual elements.

In some embodiments, the processor is configured to evaluate the initial representative event traces based on quality criteria for fitness, a number of representatives, a contextual distance and an average quality.

In some embodiments, the processor is configured to weigh the quality criteria to generate an overall quality and average the overall quality.

In some embodiments, the processor is configured to evaluate the initial representative event traces based on internal and external evaluation metrics.

In accordance with an aspect, there is provided a platform having a data storage device for storing event traces, the event traces having attributes that indicate activities over time, the event traces relating to current data and historic data. The platform has a processor configured to process machine executable instructions to generate visual elements for an interactive interface application by: generating a mapping of process mining elements to the event traces, the mapping having an XML-based set of concepts, the mapping linking process de facto models and de jure models to actual and expected customer experiences; generating a data structure for hierarchical components of a journey map, each component having an element and an attribute, the journey map having at least one element being a root node of the hierarchical components, the actual and expected customer experiences corresponding to the journey map; generating a visual elements for the components of the journey map; and transmitting the visual elements to an interface application for display on a device;

In accordance with an aspect, there is provided a platform having a data storage device for storing event traces, the event traces having attributes that indicate activities over time. The platform has a processor configured to process machine executable instructions to generate visual elements for a map abstractor of an interactive interface application by: generating a process tree for the event traces by grouping the event traces based on similar attributes, the process tree having nodes corresponding to the event traces, the process tree having leaf nodes; parsing the process tree; starting from leaf nodes of the parsed process tree, iteratively generating a prompt at an interface application to merge a set of event traces that belong to a subset of the parsed process tree; upon receiving confirmation to merge the set of event traces, generating a name for the set of event traces and replacing the nodes corresponding to the set of event traces with a new node indicating the name and a set of representative attributes for the set of event traces; generating the visual elements for an interface application, the visual elements indicating the process tree and the new nodes, the visual elements representing an abstracted process tree; controlling rendering of the interface application at a device to display the visual elements.

In some embodiments, a process tree is an abstract hierarchical representation of a process model, where the leaves are annotated with activities and all the other nodes are annotated with operators.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DETAILED DESCRIPTION

Embodiments of methods, systems, and apparatus are described through reference to the drawings.

Figure 1:
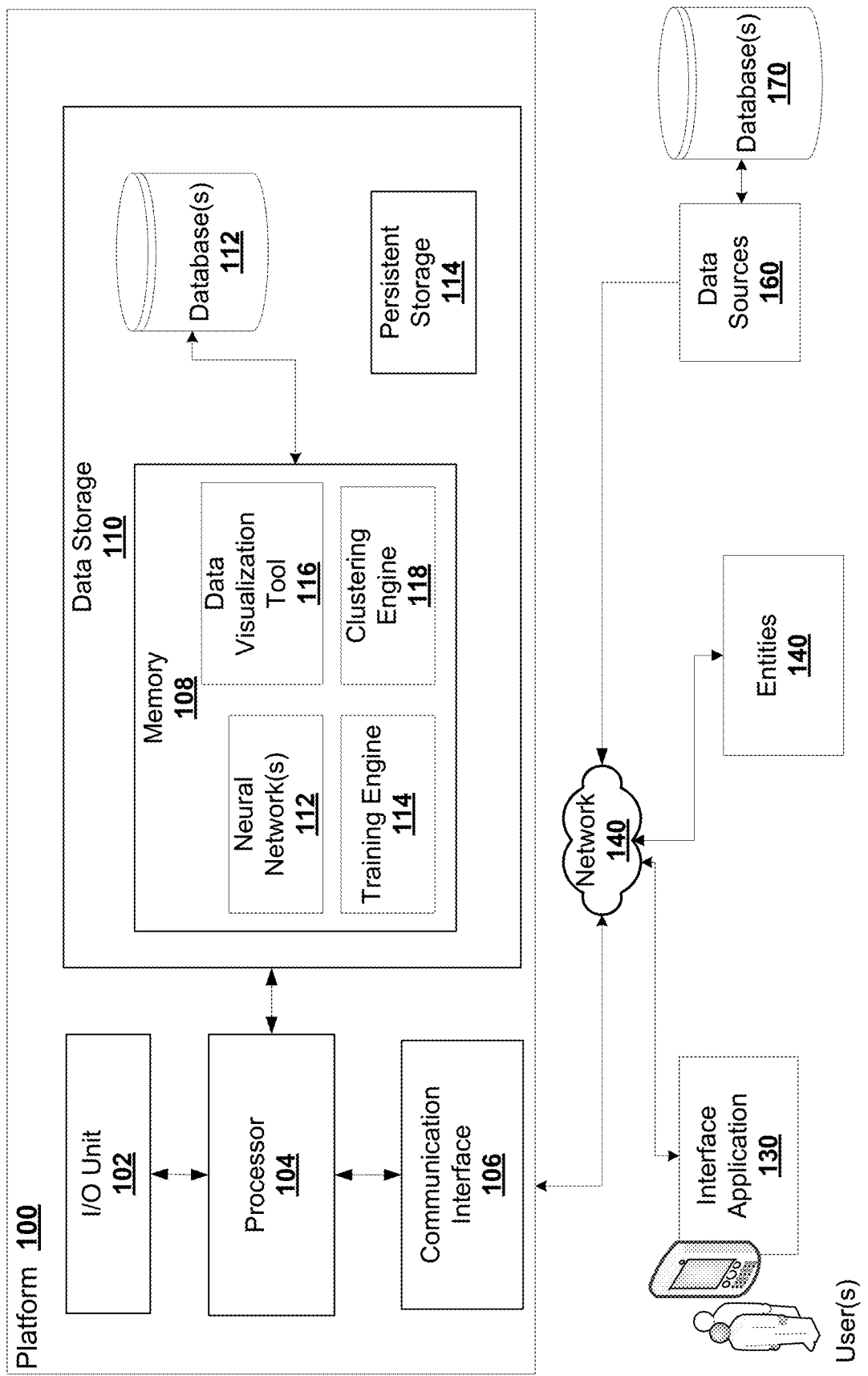
FIG. 1 is a schematic diagram of platform for clustering and data visualizations according to some embodiments.

FIG. 1 is a schematic diagram of platform 100 for clustering and data visualizations according to some embodiments. The platform 100 can implement aspects of the processes described herein for clustering data using clustering engine 118 and generating data visualizations using data visualization tool 116.

The platform 100 generates data visualizations for interface application 130 and implements event-based behavior analysis or trace analysis using clustering engine 118. The clustering engine 118 implements cluster analysis using code that processes input data to group a set of objects in clusters based on detected patterns or similarities. Machine learning involves programming code stored in memory 108 that is configured to learn, adapt or improve performance on a specific task with data, without being explicitly programmed using training engine 114 and neural networks 112. Clustering engine 118 can implement machine learning with cluster analysis to learn patterns and similarities when processing input data. Clustering engine 118 uses machine learning and cluster analysis to generate output data, and integrates with data visualization tool 116 to generate dynamic, interactive visual elements based on the output data for display at interface application 130. The interface application 130 can receive control commands that can be received as input data and trigger generation of updated visual elements by clustering engine 118 and data visualization tool 116.

The platform 100 has a processor 104 and a memory 108 storing machine executable instructions to configure the processor 104 to receive input data (from e.g. entities 140, data sources 160). The platform 100 connects to interface application 130, entities 140, network endpoints 150, and data sources 160 (with databases 170) using network 140. Entities 140, interface application 130, and data sources 160 (with databases 170) can interact with the platform 100 to provide input data and receive output data. For example the platform 100 can Network 140 (or multiple networks) is capable of carrying data and can involve wired connections, wireless connections, or a combination thereof. Network 140 may involve different network communication technologies, standards and protocols, for example. The interface application 130 can be installed on user device to display an interface of visual elements, for example.

The platform 100 can include an I/O Unit 102, a processor 104, communication interface 106, and data storage 110. The processor 104 can execute instructions in memory 108 to implement aspects of processes described herein. The processor 104 can execute instructions in memory 108 to configure neural networks 112, training engine 114, data visualization tool 116, clustering engine 118, and other functions described herein. For example, training engine 114 can train neural networks 112 using training data for cluster analysis. The clustering engine 118 can use the trained neural networks 112 to generate output data for data visualization tool 116. The neural networks 112 can generate predictions for event traces or journeys, for example. The clustering engine 118 may be software (e.g., code segments compiled into machine code), hardware, embedded firmware, or a combination of software and hardware, according to various embodiments.

The data storage device 110 has a data warehouse model for storing event traces. An event trace has attributes that indicate activities over time, for example. An event trace can be a set of touchpoints or a sequence of activities. The data storage device 110 can store event logs that represent a collection of event traces. The event traces can be used by platform 100 to generate journeys that can be actual journeys or representative journeys. The event traces can be based on real-time (e.g. current) and/or historical data. The data visualization tool 116 can generate visual elements for an interactive interface application 130 by generating clusters for the event traces using the clustering engine 118 to group event traces having similar attributes. The clustering engine 118 can cluster similar traces that are close together using distance measures. The clustering engine 118 can generate the hierarchical cluster by computing a distance measure for the attributes of the event traces to compute the similar attributes. The clustering engine 118 can generate the hierarchical cluster by computing a distance measure based on a Levenshtein distance. The clustering engine 118 can generate the hierarchical cluster by computing a distance between clusters of the hierarchical cluster. The clustering engine 118 can generate a set of representative attributes for a set of event traces of the hierarchical cluster. The set of representative attributes computed based on the similar attributes. Neural networks 112 can be used to represent the event traces and the attributes or to determine representative attributes based on patterns. Training engine 114 can train the neural networks 112 using event traces to identify patterns of attributes or activities. In some embodiments, the pattern of activities indicates the set of representative attributes for a segment of the hierarchical cluster that corresponds to the set of event traces. The clustering engine 118 can generate the hierarchical cluster based on a proximity measure using an order of activities for the event traces. The clustering engine 118 can generate the hierarchical cluster based on layers. A layer can correspond to a number of event traces that will be grouped based on the similar attributes, the layers corresponding to a height of the hierarchical cluster. In some embodiments, the clustering engine 118 generates the set of representative attributes based on the similar attributes and a frequent sequences mining process.

The data visualization tool 116 can generate the visual elements for multiple views for the interface application. The multiple views have a first view indicating a pattern of activities for the set of representative attributes. A pattern entails many event traces and indicates representative attributes for the activities or activity it represents. The clustering engine 118 can use the neural network 112 to detect the patterns, for example. A second view can indicate the hierarchical cluster and the pattern of activities within the hierarchical cluster. The second view can highlight the location of the pattern of activities in the visual representation of the hierarchical cluster. In some embodiments, the second view indicates the segment of the hierarchical cluster for the pattern of activities indicated in the first view. A third view indicates descriptors for the hierarchical cluster. The third view corresponds to the level of granularity of the first and second view and the descriptors indicate why the subset of the cluster is interesting, for example. The descriptors can indicate distinct traces, total traces and salient characteristics. In some embodiments, the processor computes salient characteristics for the descriptors to indicate indexes based on a chi-square test.

The multiple views have selectable portions that trigger the data visualization tool 116 to generate updates for the visual elements. The platform 100 controls rendering of the interface application 130 at a device to display the multiple views synchronously. Responsive to a selection of a selectable portion of the plurality of selectable portions, the platform 100 controls rendering of the interface application 130 at the device to update the multiple views synchronously based on the selected portion to navigate the hierarchical cluster. For example, the selectable portions can select attributes (e.g. activities) to filter the views (e.g. event trace contains selected activity X). In some embodiments, the selection portion is within a view of the multiple views to trigger an update to the other views of the multiple views. In some embodiments, the data visualization tool 116 updates the multiple views synchronously based on the selected portion to navigate the hierarchical cluster at different levels of abstraction or granularity.

In some embodiments, the platform 100 receives a navigation goal at the interface application 130. The goal indicates an attribute, for example. Responsive to the navigation goal, the platform 100 controls rendering of the interface application 130 at the device to update the multiple views synchronously to indicate data based on the navigation goal.

In some embodiments, the interface application 130 can show a view indicating actual event traces and a view showing representative event traces. The representative event trace being less than the actual event traces to provide an abstracted representation of the event traces. It may be difficult to see trends and insights from actual events traces if there is too much raw data shown at the interface application 130.

In some embodiments, clustering engine 118 can compute clusters of the event traces based on a genetic process function. In some embodiments, for each event trace, the attributes are represented as a two-dimensional tuple of activities over time and contextual data and the genetic process function can evaluate the two-dimensional tuples of the event traces.

Each cluster can correspond to a set of event traces and a representative event trace based on representative attributes of the set of event traces. The genetic process function maps each event trace to a cluster. The data visualization tool 116 can generate the visual elements for the interface application 130 and the visual elements can indicate the clusters and, for each cluster, the representative event trace based on the representative attributes. The representative event trace summarizes the set of event traces corresponding to the cluster. The data visualization tool 116 can control rendering of the interface application 130 at the device to display the visual elements and a plurality of selectable portions. Responsive to a selection of a selectable portion of the plurality of selectable portions, data visualization tool 116 can control rendering of the interface application 130 to navigate the clusters. The clustering engine 118 can determine segments for the event traces and then evaluate them to determine the clusters, for example. The clustering engine 118 can group the event traces into X groups and then identify a representative event trace for each group. The representative event trace does not have to be an actual event trace or representative of actual raw data but can summarize the group or cluster of event traces it represents. In some embodiments, the platform 100 can use neural networks 112 for natural language processing of text data that can form part of event traces to determine a sentiment score or sentiment indicator. This sentiment score or sentiment indicator can be an attribute for the event trace, for example. The genetic approach goes through different combinations of clusters and evaluates the clusters to determine the best segments of event traces.

In some embodiments, clustering engine 118 can implement the genetic process function by: evaluating initial set representative event traces to generate elite set representative event traces, generating additional initial representative event traces using a transformation process, evaluating the additional initial representative event traces to generate additional elite set representative event traces, continuing the generating and the evaluating until stopping criterion is met, using resulting elite representative event traces as the representative event traces for the clusters.

In some embodiments, clustering engine 118 computes, for each cluster, the representative event trace as a pattern of activities to summarize the patterns contained within the set of event traces of the cluster. In some embodiments, clustering engine 118 implements the genetic process function by pre-processing the event traces, determining an initial population that corresponds to a number of the clusters, evaluating initial representative event traces, evaluating stop criteria, implementing a genetic operation to generate additional initial representative event traces, outputting a map abstraction for use in generating additional visual elements. In some embodiments, clustering engine 118 is configured to evaluate the initial representative event traces based on quality criteria for fitness, a number of representatives, a contextual distance and an average quality. In some embodiments, the clustering engine 118 is configured to weigh the quality criteria to generate an overall quality and average the overall quality. In some embodiments, the clustering engine 118 is configured to evaluate the initial representative event traces based on internal and external evaluation metrics.

In some embodiments, the data visualization tool 116 is configured to generate visual elements for an interactive interface application by: generating a mapping of process mining elements to the event traces, the mapping having an XML-based set of concepts. The mapping links process de facto models and de jure models to actual and expected customer experiences; generating a data structure for hierarchical components of a journey map, each component has an element and an attribute. The mapping can be stored in data storage 110. The journey map has at least one element being a root node of the hierarchical components. The actual and expected customer experiences correspond to the journey map. The data visualization tool 116 is configured to generate visual elements for the components of the journey map and transmit the visual elements to an interface application for display on a device;

In some embodiments, the data visualization tool 116 is configured to generate visual elements for a map abstractor of an interactive interface application by: generating a process tree for the event traces by grouping the event traces based on similar attributes, the process tree having nodes corresponding to the event traces, the process tree having leaf nodes. The data visualization tool 116 can parse the process tree, and starting from leaf nodes of the parsed process tree, iteratively generates a prompt at the interface application 130 to merge a set of event traces that belong to a subset of the parsed process tree. Upon receiving confirmation to merge the set of event traces, data visualization tool 116 can generate a name for the set of event traces and replace the nodes corresponding to the set of event traces with a new node indicating the name and a set of representative attributes for the set of event traces. This updated representation can be stored at data storage 110. The data visualization tool 116 can generate the visual elements for the interface application 130 that indicate the process tree and the new nodes for representing an abstracted process tree and controls rendering of the interface application 130 to display the visual elements. In some embodiments, a process tree is an abstract hierarchical representation of a process model, where the leaves are annotated with activities and all the other nodes are annotated with operators. In some embodiments, a merge of activities for a first data set can enable training engine 114 and neural network 112 to learn a similar model with the same activities that can be applied the same merge or abstraction rules.

The I/O unit 102 can enable the platform 100 to interconnect with one or more input devices, such as a keyboard, mouse, camera, touch screen and a microphone, and/or with one or more output devices such as a display screen and a speaker.

The processor 104 can be, for example, any type of general-purpose microprocessor or microcontroller, a digital signal processing (DSP) processor, an integrated circuit, a field programmable gate array (FPGA), a reconfigurable processor, or any combination thereof.

Memory 108 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Data storage devices 110 can include memory 108, databases 112 (e.g. graph database), and persistent storage 114.

The communication interface 106 can enable the platform 100 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. WMAX), SS7 signaling network, fixed line, local area network, wide area network, and others, including any combination of these.

The platform 100 can be operable to register and authenticate users (using a login, unique identifier, and password for example) prior to providing access to applications, a local network, network resources, other networks and network security devices. The platform 100 can connect to different machines or entities 140.

The data storage 110 may be configured to store information associated with or created by the platform 100.

Storage 110 and/or persistent storage 114 may be provided using various types of storage technologies, such as solid state drives, hard disk drives, flash memory, and may be stored in various formats, such as relational databases, non-relational databases, flat files, spreadsheets, extended markup files, and so on.

The platform 100 can implement a processing mining based model for trace analysis or event-based behavior analysis. The platform 100 can generate an appropriate mapping for process mining in order to help trace user data and customer experience. The platform 100 can use XML-based set of concepts to implement the above mapping, for example. The platform 100 can codify a parallel that exists between different types of business process models (e.g. "de facto" and "the jure") and the ways that exist to analyze a customer experience (e.g. actual and expected).

Customer journey maps (journey maps) are data structures that model data relating to customers' behavior. Platform 100 interacts with interface application 130 to display visual representations of journey maps generated by data visualization tool 116 to assist in decision making. The platform 100 can use a journey map model with process mining, a data analytics technique to assess the impact of the journey's duration on the customer experience.

journey map is a technique that enables professionals to better understand customers' experiences when they interact with the steps involved in a service. These interactions, called touchpoints, are increasing and can be used by customers in erratic ways. Hence, being able to use journey maps is becoming increasingly important for companies. journey maps can be applied to sales, healthcare, and library science, for example.

Figure 2:
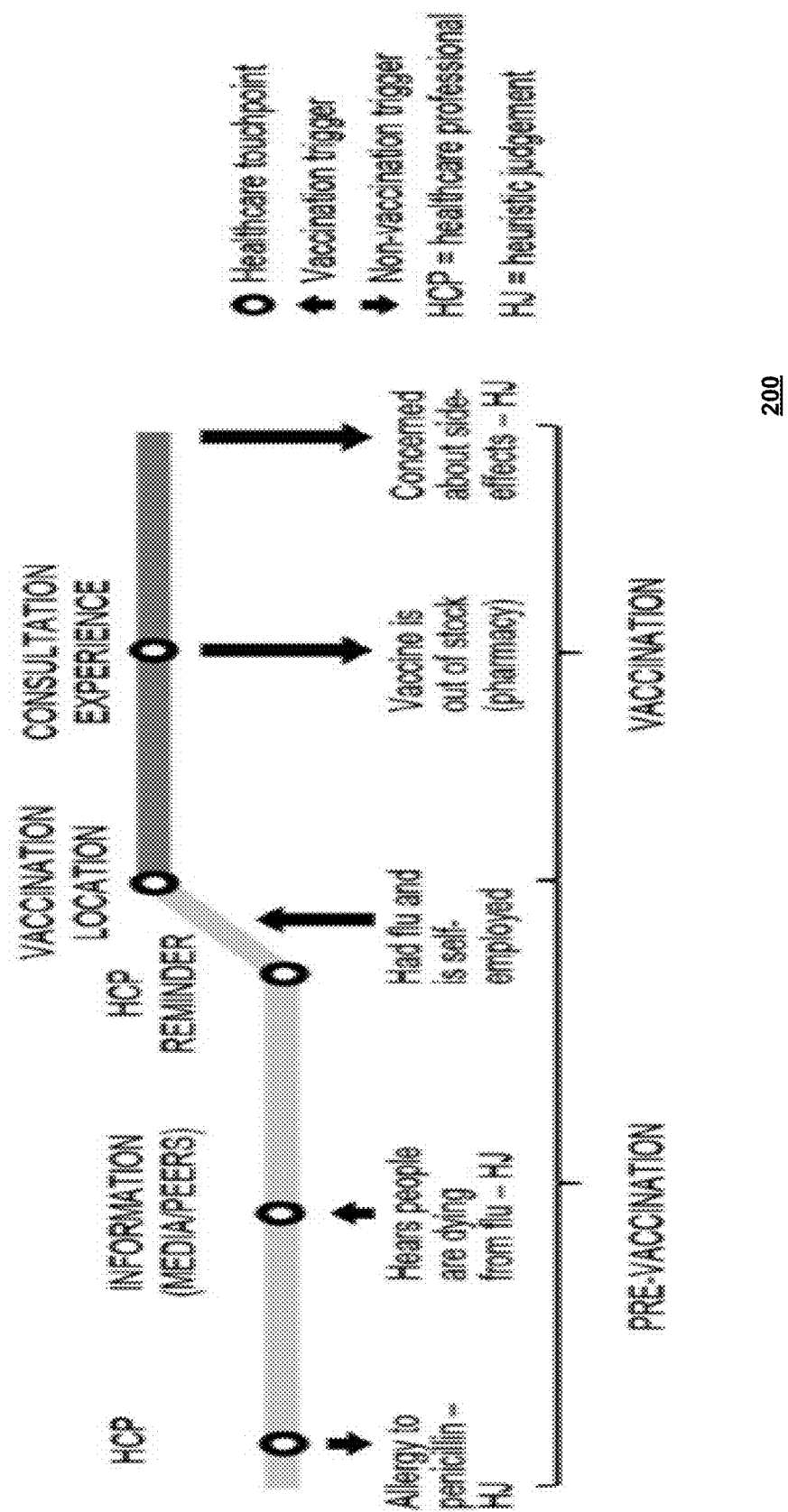
FIG. 2 shows a trace depicting factors influencing vaccination decisions.

FIG. 2 shows a journey map 200 depicting factors influencing vaccination decisions. The diagram indicates elements that can be found on journey maps: touchpoints (e.g., consultation experience), stages (e.g., pre-vaccination), and emotions (i.e., factors influencing the decision).

Two example journey maps include anticipated journey (e.g. expected journey) and actual journey, which aims to describe how the journey was "really" experienced by customers. There can be an interplay between expected and actual journeys. For instance, traces of customer journeys available in platform 100 and/or data sources 160 can be used to build a journey map from data or facts. Then, this journey map can be compared with an expected journey map generated by a prediction model.

Process mining relates to the use of process models and events logs to deliver fact-based insights. The platform 100 can use process mining for journey maps. Process mining works with event logs, a sequential format ideal for representing journey maps. Working with expected and actual models is at the core of a process mining framework. An example relates to process mining in the context of sales and how a structured approach can facilitate a sales method. Embodiments can apply process to journey map data.

Embodiments can define components of journey maps, develop a model for journey maps, use process mining to analyze journey maps, and additional analytics-oriented usage of journey maps.

There are various components of a journey map such as customer, journey, mapping, goal, touchpoint, timeline, channel, stage, experience, lens, and multimedia, for example.

Customer. A customer is the stakeholder experiencing a service. This can include people such as patients, students, or software users. A customer can be defined by sociodemographic information. When a customer is mentioned as a fictional character, the term "persona" is sometimes used.

Journey. A journey map contains at least one journey, which is a path through a graph of nodes that relates to a path followed by a customer. An example journey map can relate to internal stakeholders to describe what an ideal journey would look like, which identifies opportunities for novel services or is employed as a diagnostic tool. This can be referred to as an expected journey. In contrast, the actual journey showcases how a journey is experienced by the customer, finds existing customers' problems or needs or pictures the consumption of services by customers.

Mapping. Mapping is a process consisting of tracking and describing customers' responses and experiences when using a service. Ultimately, these elements are reported on a map.

Goal. A customer journey should be mapped with a goal in mind, which is also referred to as scenario, prompts, story, or main intention. It triggers interactions with users, and streamlines the thought process for users.

Touchpoint. A touchpoint is an interaction between customers and companies' products or services such as "searching for a product", or "finding seats". The arrangement of touchpoints can be cyclic: a customer can iterate a few times over the same touchpoints. Moreover, the arrangement can be non-linear: (1) most of the time, the customer will not go through all the existing touchpoints; (2) the customer might miss a planned touchpoint; and (3) the customer can unexpectedly quit the journey.

Timeline. The timeline describes the duration of the journey from the first until the last touchpoint. Data can also not have a timestamp. A number attached to an event (i.e., touchpoint) can depict the sequence within the timeline.

Channel. The channel is the method chosen by the customer to interact with the touchpoint such as a "reference desk" or "social media".

Stage. A stage encompasses several touchpoints. Some authors used the splits: before, during, and after the experience, but employing domain-related steps is also possible. For instance, the stage refers to the waterfall model (i.e., software development). Some journey maps might not use stages.

Experience. The experience encompasses customers' feedback and emotions. There can be elements to express the experience. One element can be the emotion. Using only one continuum of emotions—such as unhappy to happy—may fail to depict a customer's experience. Thus, describing the emotion can require some flexibility or a range of values. An element can be a scale that measures how positive or negative the experience was for the customer. Another element may be customers' quotes to represent what customers have been through.

Lens. Some components of journey maps are domain-specific. For instance, there can be an appended layer to indicate the weather because it impacts customer satisfaction when using the service. The layer can refer to the term lens to reflect that multiple views are possible on the same map. Suggestions and opportunities are some other examples of lenses superposed on top of touchpoints. They can promote reflection and analysis of what happened during the journey. The lens can trigger different visual representations on interface application 130 and data visualization tool 116 can generate different lens for a journey map involving different visual elements.

Multimedia. The usage of multimedia as part of a visual representation on interface application 130 can make a journey map engaging. For instance, recording customers while they are filling out the journey map allows to better understand them. Multiple types of multimedia can be used such as audio, video, photos, and sketches.

Figure 3:
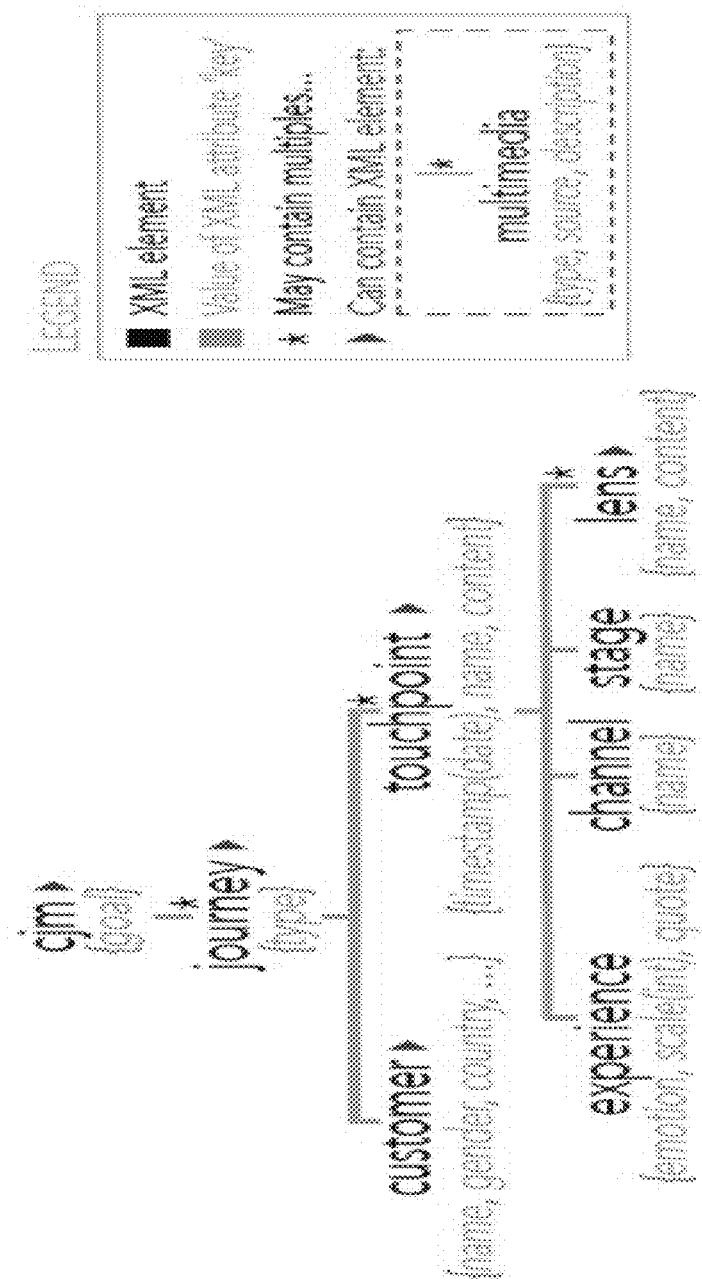
FIG. 3 shows an example trace model.

FIG. 3 shows an example journey map model 300. The model 300 includes an example XML data structure to store journey maps using concepts (journey, customer, touchpoint, experience, channel, stage, lens) arranged in a hierarchical structure. The structure can be used as an import log for process mining. The platform 100 can generate the journey map model 300.

The example delineates a hypothetical situation in the retail industry. Alice (a customer) called to complain. Therefore, the top management decided to map her journey based on historical data. They observed three events: (1) Alice asked for a quotation, (2) she received the quotation, and (3) the call she made to complain. Example code may be:

```
<cjm>
    <string key="goal" value="Understand why sales processes take so long"/>
    <journey>
        <string key="type" value="actual"/>
        <customer>
            <string key="name" value="Alice"/>
        </customer>
        <touchpoint>
            <date key="timestamp" value="2016-05-07T10:26:10"/>
            <string key="name" value="Asking for a quotation"/>
        </touchpoint>
        <touchpoint>
            <date key="timestamp" value="2016-06-08T10:18:03"/>
            <string key="name" value="Receiving the quotation"/>
            <lens>
                <string key="name" value="observation"/>
                <string key="content" value="The duration is too long"/>
            </lens>
        </touchpoint>
        <touchpoint>
            <date key="timestamp" value="2016-06-08T11:52:12"/>
            <string key="name" value="Calling the helpdesk"/>
            <string key="content" value="Complaining about delay"/>
            <experience>
                <string key="emotion" value="Frustration"/>
                <int key="scale" value="-2"/>
            </experience>
        </touchpoint>
    </journey>
</cjm>
```

In order to map the journey, the model 300 has a root element "journey map". The model 300 allows for the description of a "goal" described within an element "string". This notation refers to attribute coding. Going down the tree or hierarchical data structure, an element "journey" is a child node to the root element. This journey map model 300 contains only one journey, but the platform 100 can allow for more than one (denoted by * in FIG. 3). The model 300 has the "customer" attribute, which can describe Alice. Different levels of detail are provided for each touchpoint that illustrates the flexibility of the model 300. For instance, the first one indicates only the name of the touchpoint and the time, while the second one has a lens "observation". Finally, the model 300 represents the "experience" using two attributes: emotion, and scale.

The model 300 can consider front-stage activities; i.e., the ones visible to the customer. The model 300 can consider the path to be potentially cyclic and non-linear (e.g. "Touchpoint.*", excluding gateways (e.g., "XOR"). Customers' paths can only be influenced, but not controlled. Moreover, a journey represents a path performed by a single customer. If that was not the case (i.e., gateways allow a single path to represent multiple alternative journeys), the multiplication of touchpoints and the freedom that customers have to navigate through them in their preferred orders may lead to a meaningless map showing that anything can happen in any order (referred to as a "flower model" in process mining). These decisions can reduce the complexity of the model by emphasizing the main goal of journey maps.

Platform 100 can integrate journey map models with process mining and provide a set of tools that support multiple ways to discover, monitor, and improve processes based on real event logs. Platform 100 can provide a link between process models (e.g., BPMN) and the "reality" captured in event logs. We distinguish a "de jure" model from a "de facto" model. The former is normative, as it intends to steer or control the reality. In contrast, de facto models aim to delineate reality. Process mining provides a logic code to analyze or join both worlds. For instance, one can discover a "de facto" model from the event logs. In turn, one can compare this former model with a "de jure" one.

Figure 4:
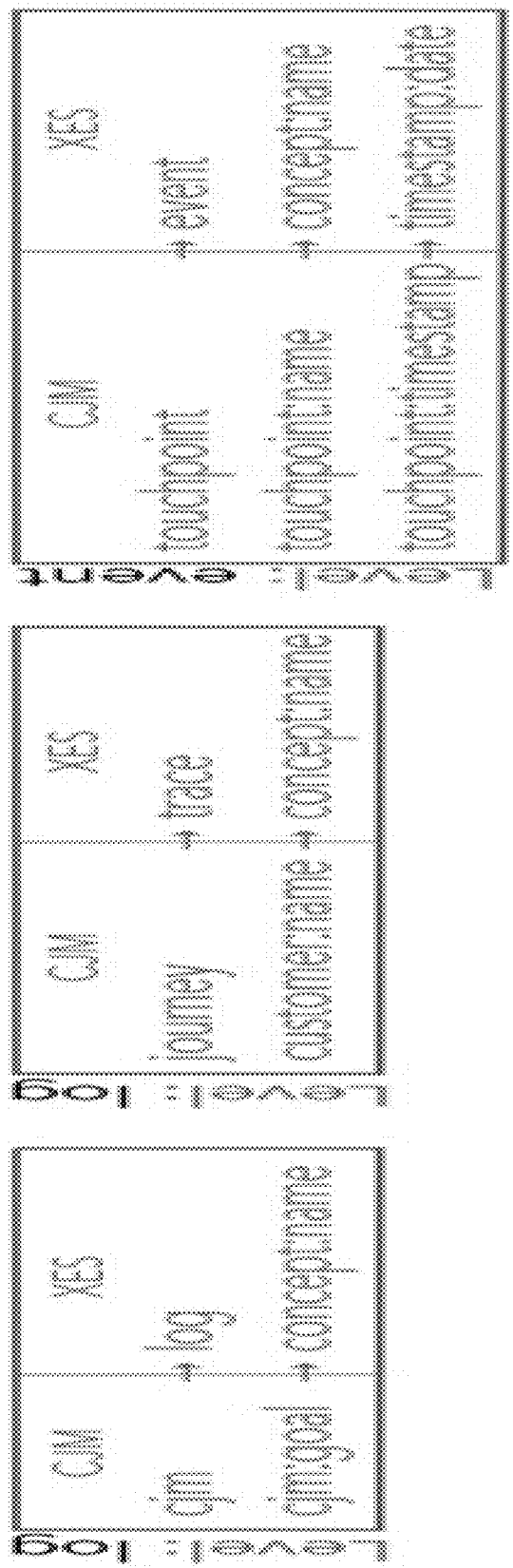
FIG. 4 shows the mapping of the XES concepts to a model generated by platform.

FIG. 4 shows the mapping 400 of the XES concepts to a model generated by platform 100. Once the mapping 400 is done, the data can be analyzed with process mining. For example, a company can use event logs to answer the following question: does the duration between asking the quotation and receiving it affect the customer's experience?

Figure 5:
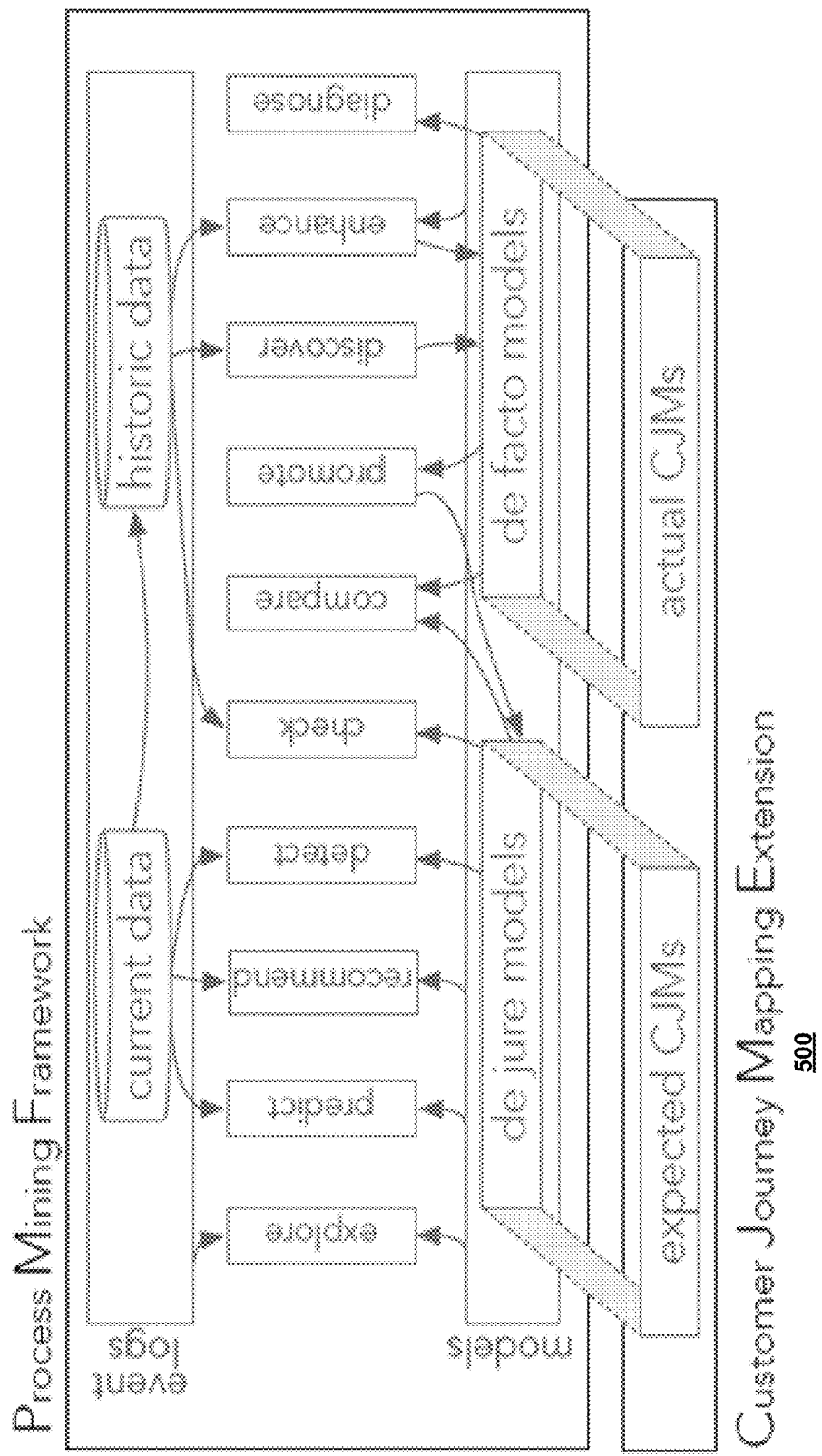
FIG. 5 shows the process mining framework extended for trace models.

FIG. 5 shows the process mining framework with a journey map model extension 500 that can be stored by platform 100. The top portion shows the process mining framework. The model can be implemented using XES for process mining to integrate journey map with the process mining framework. Platform 100 can combine data on top of models in process mining to provide a basis to tackle customer journeys using a rigorous approach. Respectively, the expected and actual journey maps correspond to the "de jure" and "de facto" process models.

Figure 6:
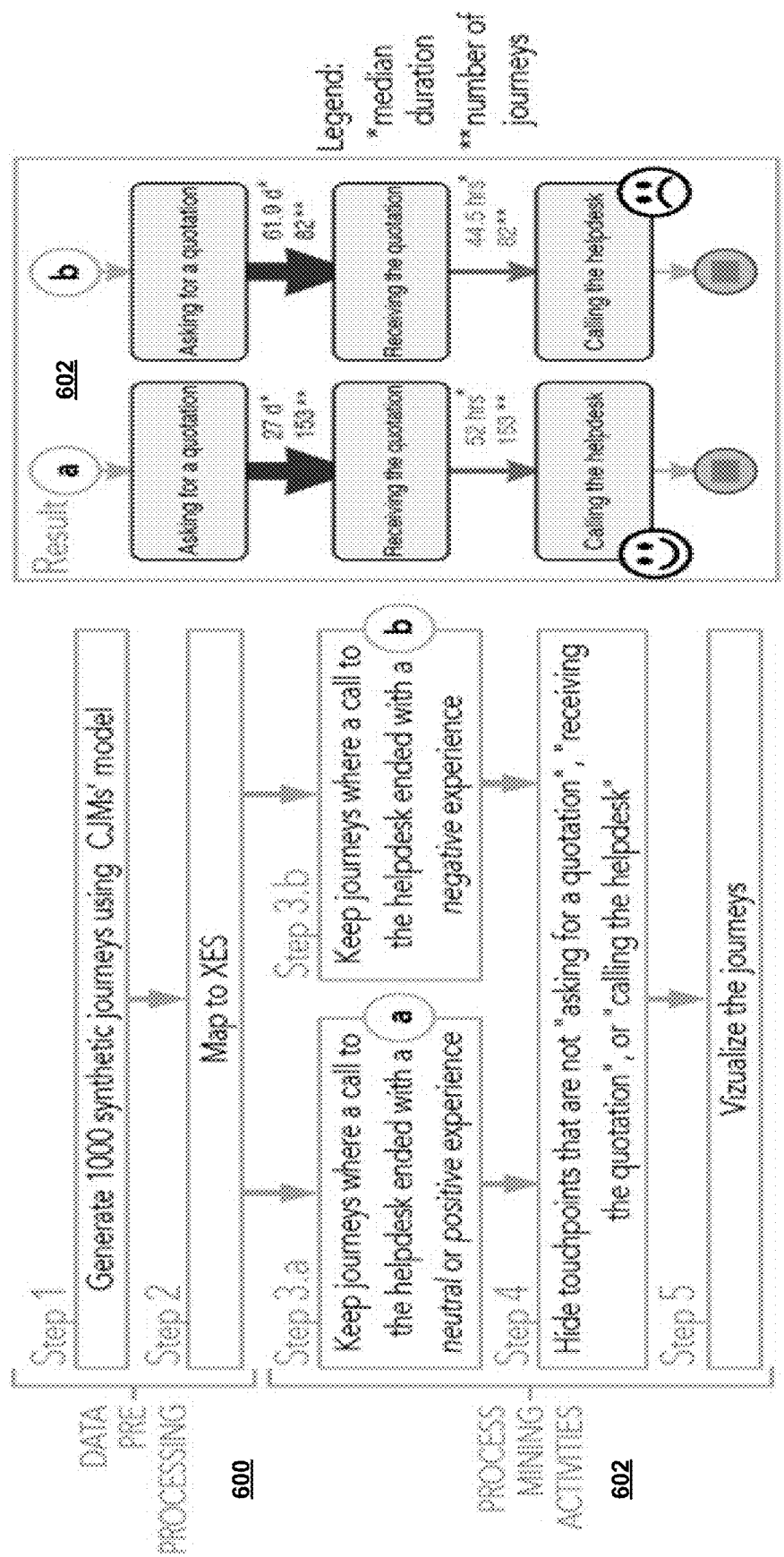
FIG. 6 shows the application of process mining activities on trace data and results.

FIG. 6 shows the application of process mining activities 600, 602 on journey map data and results 604. This can involve data pre-processing 600 by platform 100 to generate synthetic journeys using journey map models. The platform 100 can map the journeys to XES. This can involve process mining 602 by platform 100 to create a set of journeys that result in a neutral or positive experience and a set of journeys that result in a negative experience. This can involve hiding touchpoints. The platform 100 generates visualizations or visual elements of the journeys for display at interface application 130.

The platform 100 can generate models that are easily exploitable by data analytics tools, is extensible to fit a domain-specific application, and it is not tool-dependent. By bringing process mining techniques and journey maps closer together, platform 100 can close the gap between actual and expected journey maps and we shed light on a potential new area of research, which requires further investigations with real-life collections of journey maps.

The platform 100 uses process mining that integrates with journey map specificities and cluster journeys and their representatives, to predict the next customer's touchpoint, and to navigate among the journeys.

The platform 100 can use neural networks 112 for natural language processing and sentiment analysis of text data from journey map data to generate tools for process mining.

The platform 100 can model and used a dynamic Data Warehouse (e.g. at data storage 110) for storing the event traces in order to facilitate fast access and storage of historical (processed) data. The platform 100 can implement a process for clustering the traces using hierarchical clustering. An example trace can be a customer journey map (or journey map). A journey map can indicate or represent different journeys. The clustering can be based on the Levenshtein distance, for example. This has not been used with events that are characterized by several touch-points. The platform 100 can implement a process for selecting specific attributes/touchpoints and guiding the analysis of focused areas of the hierarchical clustering tree through the notion of "goals". The platform 100 can generate visualizations composed of different views that are updated synchronously to allow end-user to navigate within traces. These views fulfill distinct objective: 1) The first one allows to understand the pattern of activities, 2) the second one offers a holistic view of the hierarchical cluster, and 3) the last one is an area to display descriptive statistics.

The platform 100 can configure interface application 130 to provide a trace interface that uses hierarchical clustering and indexes for interactive navigation through numerous traces stored as event log formats, for example. The interactive navigation by interface application 130 enables exploration of the underlying traces of the whole set of data available to platform 100 or driven by user goals in order to examine events and patterns in specific areas of interest.

Traces can provide an understanding of the quality of customer experience at an end-to-end level. The ever growing amount of services offered to users for consumption has made the ability to understand their behavior very important. Similarly important is the knowledge extracted by the increasing number of ways organizations interact with their customers; e.g., a customer might visit a physical store, purchase a product online, and provide feedback on social media which can be collected as a holistic data set for use by platform 100. Traces allow for better understanding of a customer's end-to-end experience when using a service by mapping any interactions with the company (called touchpoints) on a map that ultimately contributes to better understanding and serving customer needs.

A model for traces can be integrated with process mining techniques. The platform 100 can configure interface application 130 to explore numerous customer journeys at the same time. The platform 100 can take event logs as input, without using any a-priori information and generate visual elements for journeys. Visualizing event logs on traces enables focus on personal customer activities (e.g., by incorporating customer emotions), rather than the "internally-focus problem-solving approach" and traces can incorporate customer journeys that are deemed exceptional behaviors, rather than removing them to increase model readability.

Representing many customer journeys in an intelligible can be a challenge. There are limits on the number of journeys to be compared (e.g. less than ten), making the overall process relatively straightforward. However, we argue that companies in the service industries tend to deal with hundreds or thousands of journeys. To overcome this challenge and identify different areas of interest, a hierarchical clustering process is employed to segment the original data. The hierarchical nature allows for a top-down navigation of automatically generated groups of similar journeys. Once the clusters are formed, platform 100 and interface application 130 are able to leverage the contextual information that comes along a typical customer journey such as the customers' characteristics, or the emotions. The platform 100 can use indexes in order to explain why the different clusters were generated. The platform 100 can let the users define their own exploration goals, making it the first goal-oriented tool that allows analysts to set a-priori goals to guide their journey exploration.

The platform 100 can configure interface application 130 with visual representations to show how numerous event logs can be displayed onto traces and can let users navigate into these journeys.

The platform 100 can let users upload and explore their own dataset using a trace or journey map layout. To limit the number of journeys displayed on the interface application 130 and allow for an intuitive exploration, the platform 100 uses hierarchical clustering.

Figure 7:
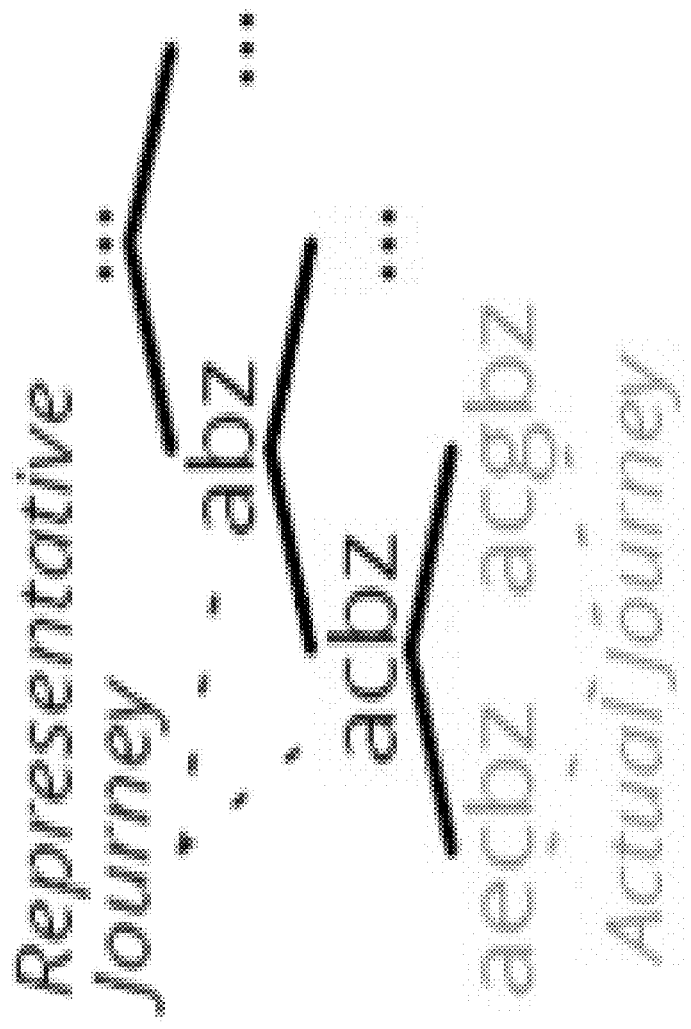
FIG. 7 shows an example hierarchical clustering that can be generated by the platform.

FIG. 7 shows an example hierarchical clustering tree 700 that can be generated by the platform 100. Each letter represents an activity of an event trace and the tree is built bottom up by merging the activities that are most similar at each iteration. By default, the platform 100 uses a hierarchical process based on a proximity measure that takes into account the order of activities and is a variant of the Jaccard similarity based on shingles. In the clustering tree 700 (or dendrogram), the journeys seen in the event logs are at the leaf level and as they get merged they form "representative" journeys or event traces. That is, a journey can refer to an event trace. A representative journey is a single pattern of activities whose purpose is to summarize the patterns contained in a cluster. Because the representative journeys at the top of the tree summarize many—potentially distant—journeys, it will tend to show only few activities shared by many. In contrast, the representative journeys closer to the leafs will show more details. The first layers show general patterns and hide less important activities—like a world map would omit small cities. However, interface application 130 allows a drill-down into 'countries' of interest (i.e., pattern of activities), which would redirect to new traces where the previously hidden 'cities' (i.e., omitted activities) will be shown on interface application 130.

Figure 8:
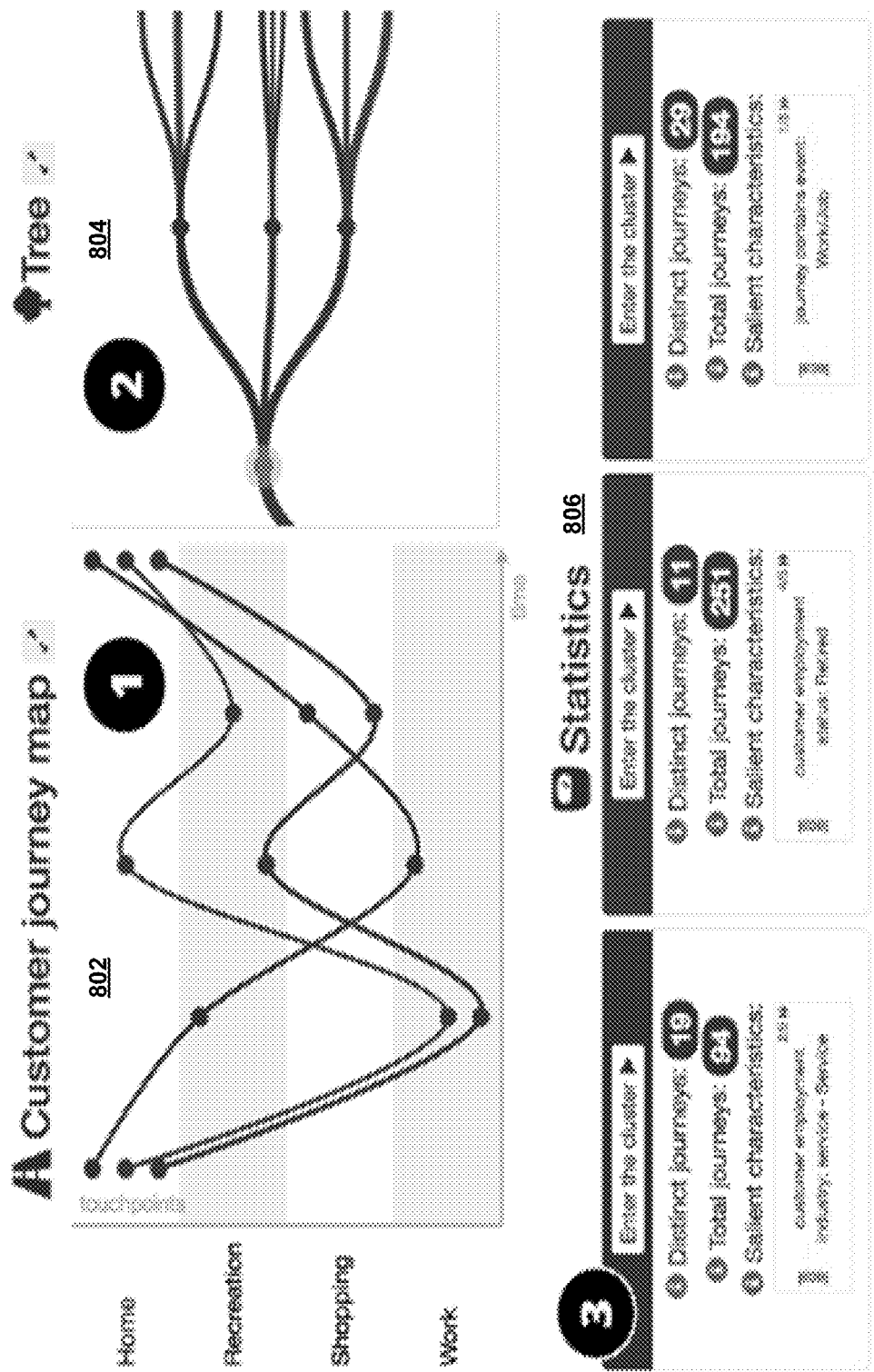
FIG. 8 is an example screenshot visible at interface application and points out three views that are available to navigate the clusters.

FIG. 8 is an example screenshot visible at interface application 130 and points out three views: journey map view 802, tree view 804, and textual view 806 that are available to navigate the clusters. Each of these views fulfills specific objectives. First, the journey map view 802 shows journeys that are in the same cluster. This representation allows to easily compare the pattern of activities. Second, the tree view 804 displays the hierarchical structure of the journey clusters—useful in providing a holistic view of the clusters and current location. Third, a box per cluster view 806 provides a convenient means to display indexes named "salient characteristics". In this example, the salient characteristics is the top 5 results of a chi-square test applied on all the contextual information. For instance, if at a global level (the entire dataset) the number of women is equal to the number of men, it might be surprising to find a cluster with large majority of women. Therefore, this information might come up as one of the top 5 salient characteristics.

Moreover, the user might be interested in specific characteristics occurring during the journey. For this reason, we allow user-defined goals. For instance, one might be interested in journeys that started by the activity "attending class" experienced by young people.

The data storage device 110 has a data warehouse model for storing event traces. An event trace has attributes that indicate activities over time, for example. An event trace can be a set of touchpoints or a sequence of activities. The data storage device 110 can store event logs that represent a collection of event traces. The event traces can be used by platform 100 to generate journeys that can be actual journeys or representative journeys. The event traces can be based on real-time (e.g. current) and/or historical data.

The data visualization tool 116 can generate visual elements of an interface 800 for an interactive interface application 130 by generating clusters for the event traces using the clustering engine 118 to group event traces having similar attributes. The clustering engine 118 can cluster similar traces that are close together using distance measures. The clustering engine 118 can generate the hierarchical cluster by computing a distance measure for the attributes of the event traces to compute the similar attributes. The clustering engine 118 can generate the hierarchical cluster by computing a distance measure based on a Levenshtein distance. The clustering engine 118 can generate the hierarchical cluster by computing a distance between clusters of the hierarchical cluster. The clustering engine 118 can generate a set of representative attributes for a set of event traces of the hierarchical cluster. The set of representative attributes computed based on the similar attributes. In some embodiments, the pattern of activities indicates the set of representative attributes for a segment of the hierarchical cluster that corresponds to the set of event traces. The clustering engine 118 can generate the hierarchical cluster based on a proximity measure using an order of activities for the event traces.

The data visualization tool 116 can generate the visual elements for multiple views 802, 804, 806 for the interface 800. A first view 802 indicates a pattern of activities for the set of representative attributes. The first view 802 can indicate representative event traces as an ordered set of activities (home, recreation, shopping, work) over time. A pattern or representative event trace entails many event traces and indicates representative attributes for the activities it represents.

A second view 804 can indicate the hierarchical cluster and the pattern of activities within the hierarchical cluster. The second view can highlight the location of the pattern of activities in the visual representation of the hierarchical cluster. In some embodiments, the second view indicates the segment of the hierarchical cluster for the pattern of activities indicated in the first view. The clustering engine 118 can generate the hierarchical cluster based on layers and a subset of the layers can be shown in the view 804. A layer can correspond to a number of event traces that will be grouped based on the similar attributes. The layers correspond to a height of the hierarchical cluster. In some embodiments, the clustering engine 118 generates the set of representative attributes based on the similar attributes and a frequent sequences mining process.

A third view 806 indicates descriptors for the hierarchical cluster. The third view 806 corresponds to the level of granularity of the first and second view 802, 804 and the descriptors indicate why the subset of the cluster is interesting, for example. The descriptors can indicate distinct traces, total traces and salient characteristics. In some embodiments, the processor computes salient characteristics for the descriptors to indicate indexes based on a chi-square test.

The multiple views 802, 804, 806 have selectable portions that trigger the data visualization tool 116 to generate updates for the visual elements. The platform 100 controls rendering of the interface application 130 to display the multiple views 802, 804, 806 synchronously. Responsive to a selection of a selectable portion of the plurality of selectable portions, the platform 100 controls rendering of the interface application 130 to update the multiple views 802, 804, 806 synchronously based on the selected portion to navigate the hierarchical cluster. For example, the selectable portions can select attributes (e.g. activities) to filter the views 802, 804, 806 (e.g. event trace contains selected activity X). In some embodiments, the selection portion is within a view of the multiple views to trigger an update to the other views of the multiple views. For example, a selection in view 804 can trigger an update to the other views 802, 804. In some embodiments, the data visualization tool 116 updates the multiple views synchronously based on the selected portion to navigate the hierarchical cluster at different levels of abstraction or granularity.

In some embodiments, the interface application 130 can show a view indicating actual event traces and a view showing representative event traces. The representative event traces being less than the actual event traces to provide an abstracted representation of the event traces. It may be difficult to see trends and insights from actual events traces if there is too much raw data shown at the interface application 130.

In some embodiments, the platform 100 receives a navigation goal at the interface application 130. The goal indicates an attribute, for example. Responsive to the navigation goal, the platform 100 controls rendering of the interface application 130 at the device to update the multiple views synchronously to indicate data based on the navigation goal.

Figure 9:
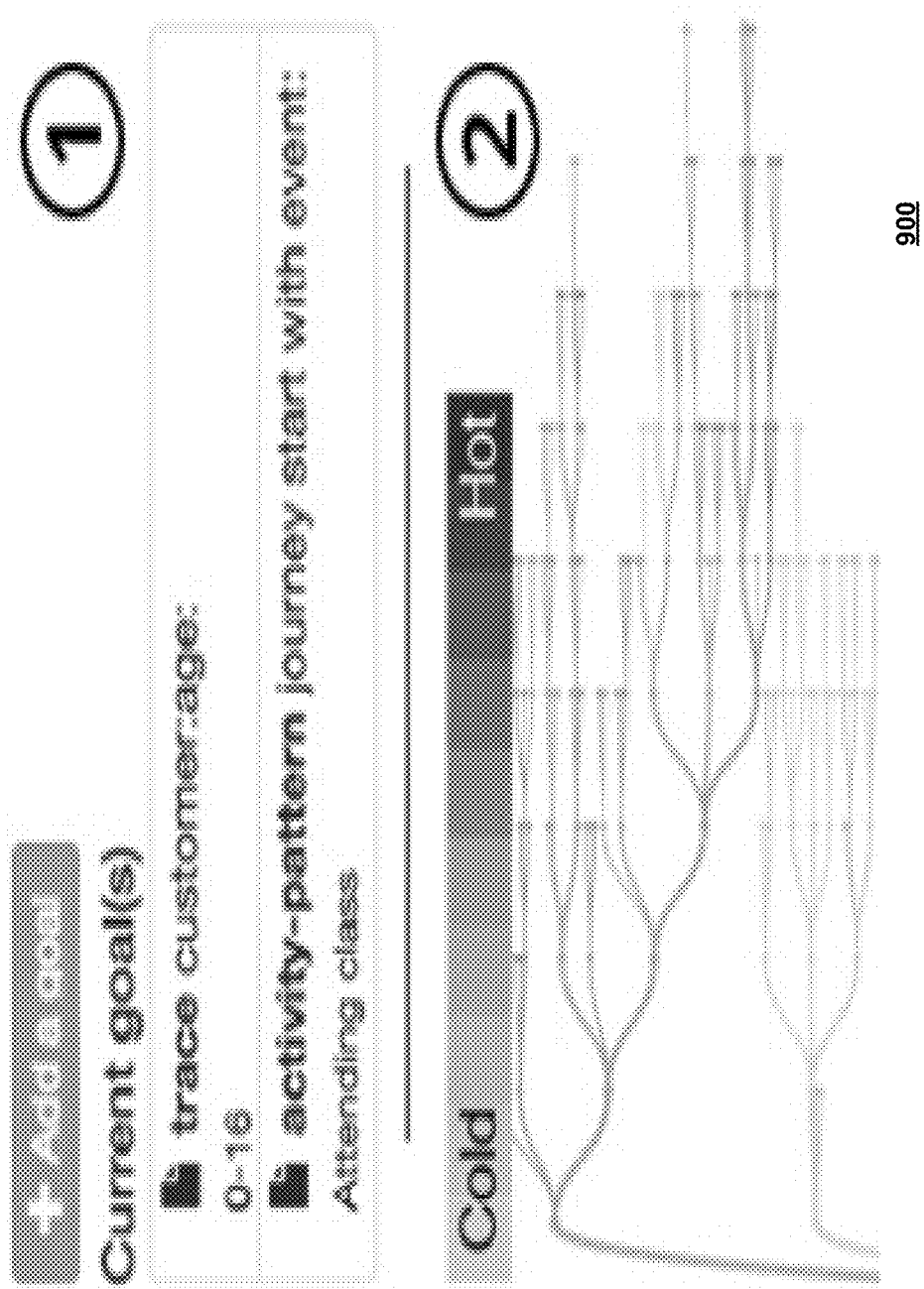
FIG. 9 shows a screenshot of interface application for goal setting impact on a tree.

FIG. 9 shows a screenshot 900 of interface application 130 for goal setting impact on a tree. The top part displays the settings, while the bottom part shows that some branches of the tree are interesting with regards to the goal (red "hot" area at the top). Hence, the application 130 allows navigation without using any a-priori information, but also setting navigation goals, and guidance by the resulting colors.

Finally, when moving from one view to the others, the three views are updated on interface application 130 synchronously, allowing a smooth exploration amongst journeys.

The platform 100 can involve main elements: 1) a web interface; 2) the XES-parser; 3) Hcluster; and 4) a data warehouse. The elements include parameters.

Web interface. For example, the web interface leverages bootstrap, jquery and d3js to provide a user-friendly interface to upload and navigate journeys. Both the journey map view and the tree view are implemented in d3js. There may be other implementations.

XES Parser. The platform 100 works with event logs. More specifically, platform 100 can leverage XES (eXtensible Event Stream) within process mining. The XES Parser can be a Java implementation that encapsulates the OpenXES library to parse XES file.

Figure 10:
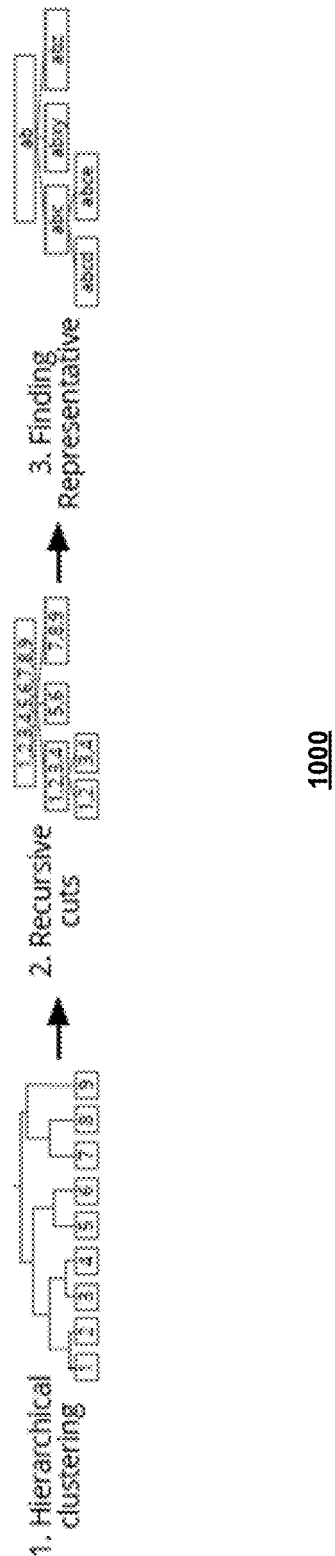
FIG. 10 illustrates a cluster implementation containing example steps.
Figure 11:
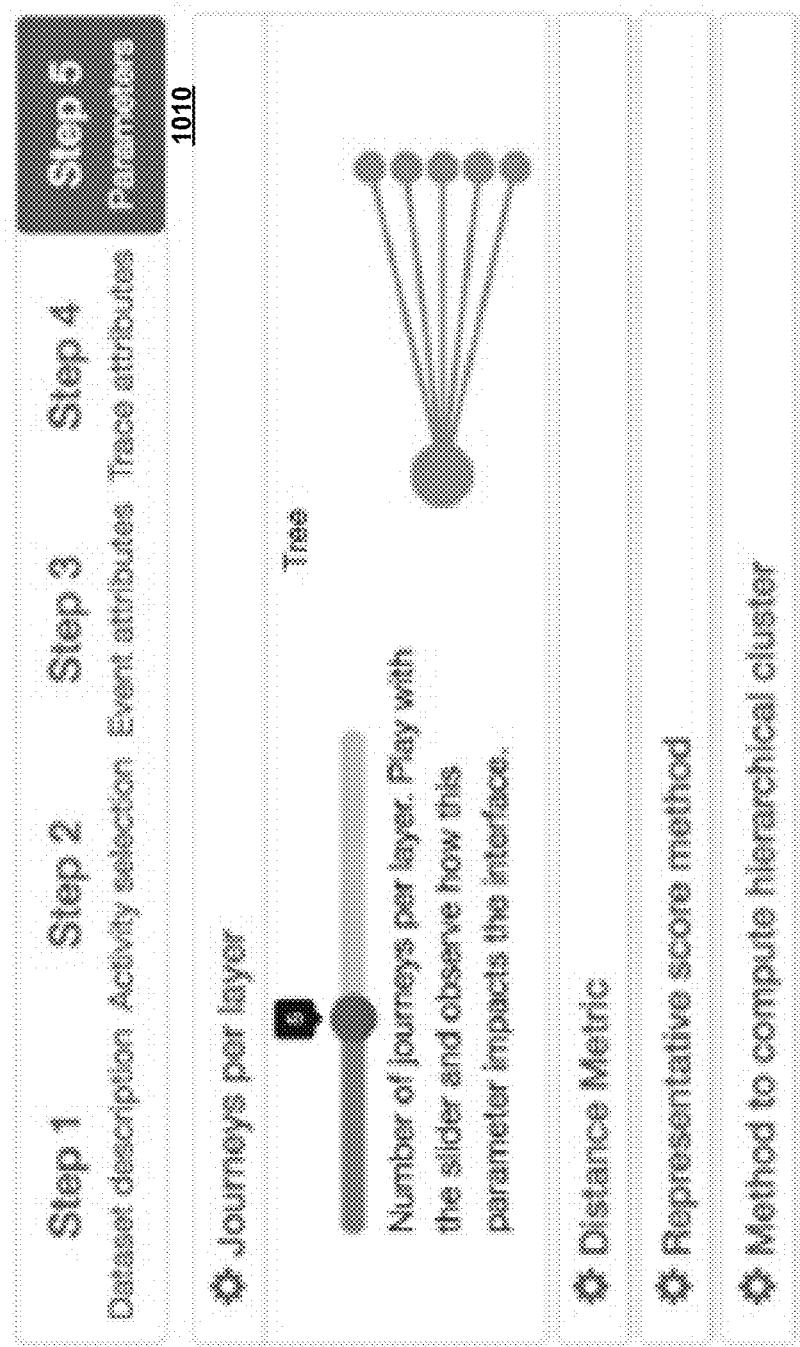
FIG. 11 illustrates a preview of the parameters when uploading a dataset.

Hcluster. Hcluster is an implementation containing the three steps for example. FIG. 10 illustrates example steps 1000. A step is the hierarchical clustering implemented using Scipy. Two parameters can be provided as inputs: the distance measure between event sequences and the methods for calculating the distance between clusters. They can both be chosen by the user when uploading a dataset. FIG. 11 illustrates a preview of the parameters 1010 when uploading a dataset. It seems that using shingles as a distance metric provides a more intuitive way to navigate through journeys. Once the hierarchical cluster is formed, the next step consists of cutting the clustering to form layers. A layer is a set of predetermined number of journeys that will be grouped together and will ultimately appear on the same trace. To achieve this, the platform 100 can recursively cuts the dendrogram returned by Scipy. A small number of journeys will lead to a simple journey map that is easy to visualize, but also works for more complex tree structures (i.e., trees with larger height). Another step consists of finding the representative journey using a frequent sequences mining process.

Data Warehouse. Each dataset is saved by data storage 110 in its own database schema designed as a star schema. Data storage can store a full schema or all the information required to use the application (e.g., clusters, journeys, events) as well as some precomputations. For instance, the platform 100 can count the number of occurrences for each characteristic at each cluster, so the goals and the salient characteristics can be retrieved quickly.

Altogether, the parameters visible in FIG. 11 allow users to explore the exact same dataset from different perspectives.

The platform 100 can process many journeys for display onto journey map or traces in an intelligible and efficient manner. The platform 100 integrates process mining taskforce (i.e., XES) and process mining activity (i.e., discovery).

The platform 100 can cluster events (traces) for the discovery of the number of segments (clusters) that exist. The platform 100 can implement a process that automatically finds the best representatives. This technique is based on genetic processes. Except for the timing and the title of each activity in a trace of events, the platform 100 can take into account any contextual information of the activities, for example looks into any text the users wrote or any emotion they showed.

In some embodiments, clustering engine 118 can compute clusters of the event traces based on a genetic process function. In some embodiments, for each event trace, the attributes are represented as a two-dimensional tuple of activities over time and contextual data and the genetic process function can evaluate the two-dimensional tuples of the event traces.

Each cluster can correspond to a set of event traces and a representative event trace based on representative attributes of the set of event traces. The genetic process function maps each event trace to a cluster. The data visualization tool 116 can generate the visual elements for the interface application 130 and the visual elements can indicate the clusters and, for each cluster, the representative event trace based on the representative attributes. The representative event trace summarizes the set of event traces corresponding to the cluster. The data visualization tool 116 can control rendering of the interface application 130 at the device to display the visual elements and a plurality of selectable portions. Responsive to a selection of a selectable portion of the plurality of selectable portions, data visualization tool 116 can control rendering of the interface application 130 to navigate the clusters. The clustering engine 118 can determine segments for the event traces and then evaluate them to determine the clusters, for example. The clustering engine 118 can group the event traces into X groups and then identify a representative event trace for each group. The representative event trace does not have to be an actual event trace or representative of actual raw data but can summarize the group or cluster of event traces it represents. In some embodiments, the platform 100 can use neural networks 112 for natural language processing of text data that can form part of event traces to determine a sentiment score or sentiment indicator. This sentiment score or sentiment indicator can be an attribute for the event trace, for example. The genetic approach goes through different combinations of clusters and evaluates the clusters to determine the best segments of event traces.

In some embodiments, clustering engine 118 can implement the genetic process function by: evaluating initial set representative event traces to generate elite set representative event traces, generating additional initial representative event traces using a transformation process, evaluating the additional initial representative event traces to generate additional elite set representative event traces, continuing the generating and the evaluating until stopping criterion is met, using resulting elite representative event traces as the representative event traces for the clusters.

In some embodiments, clustering engine 118 computes, for each cluster, the representative event trace as a pattern of activities to summarize the patterns contained within the set of event traces of the cluster. In some embodiments, clustering engine 118 implements the genetic process function by pre-processing the event traces, determining an initial population that corresponds to a number of the clusters, evaluating initial representative event traces, evaluating stop criteria, implementing a genetic operation to generate additional initial representative event traces, outputting a map abstraction for use in generating additional visual elements. In some embodiments, clustering engine 118 is configured to evaluate the initial representative event traces based on quality criteria for fitness, a number of representatives, a contextual distance and an average quality. In some embodiments, the clustering engine 118 is configured to weigh the quality criteria to generate an overall quality and average the overall quality. In some embodiments, the clustering engine 118 is configured to evaluate the initial representative event traces based on internal and external evaluation metrics.

Summarizing numerous customer trajectories is challenging. The platform 100 uses clustering to summarize sequences of categorical data. Using synthetic datasets simulating customer journeys, as well as a real dataset, the platform 100 is flexible and returns customer journeys of better quality.

A customer experience can be defined as a customer's journey with a firm over time across multiple interactions called touchpoints. A journey can be as simple as a single activity (e.g., 'looking at a product'), but can also involve complex interactions through various channels, multiple devices, and from several locations. Customer interactions are increasing, services are becoming more complex, and customers can be unpredictable. Moreover, there is an increasing number of customer-to-customer interactions, which are drivers of variability and unpredictability. Overall, offering a great customer experience is a challenging task, partly due to the lack of conceptual clarity. Furthermore, a lack of a unified understanding of customers can be an obstacle to mobilizing employees around integrated touchpoints, journeys, and consistent experiences.

Concretely, a challenge faced by many practitioners is to make sense of the—potentially infinite—combination of activities that exist in order to consume a service. A trace is a conceptual tool used to better understand customers' trajectories when they are consuming a service. It depicts typical journeys that will be experienced by the customers across several touchpoints. Multiple types of journeys can be included on a trace. When a trace is used as a design thinking tool by internal stakeholders to discuss, challenge, or innovate the way a service is offered to customers, expected journeys are used. This implies a dyadic relation in which it cannot be assumed that the experience is perceived by customers as intended by the internal stakeholders. A trace can also be used to understand how the service is really perceived and experienced by customers, either by directly eliciting their opinion through surveys and special tools, or by leveraging evidences stemming from data. In this case, it can be referred to it as the actual journey.

Figure 12:
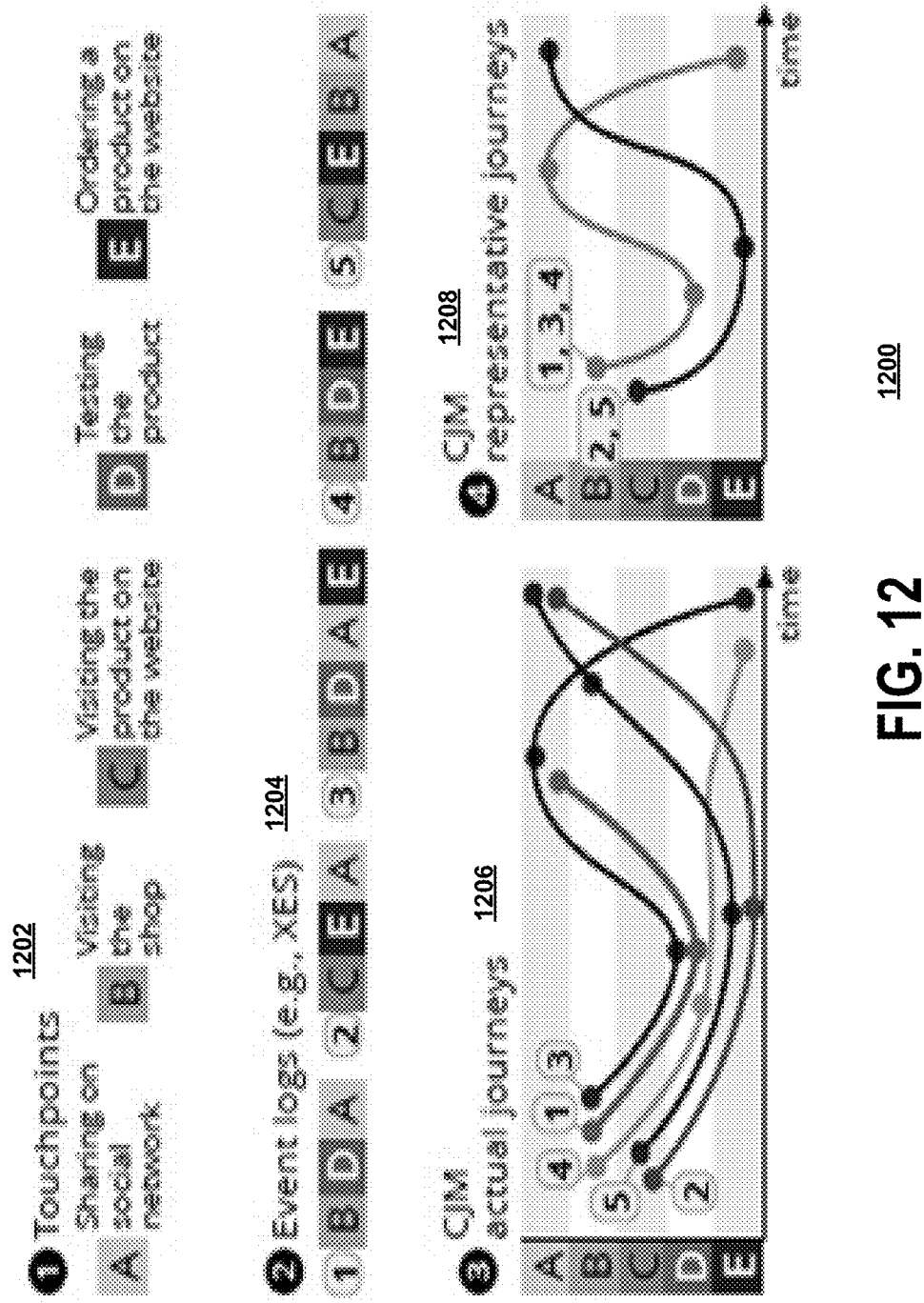
FIG. 12 is an example screenshot of interface application.

The platform 100 can transform a set of actual journeys into a few representative journeys with the aim of displaying them on a interface application 130 as visual elements. FIG. 12 is an example screenshot 1200 of interface application 130. This task is illustrated in the four parts of FIG. 12.

For the sake of the example, the screenshot 1200 defines five typical touchpoints 1202 with which a customer might interact when buying a product Then, screenshot 1200 can depict five journeys by event logs 1204 composed of three to four touchpoints. We consider these journeys to be actual because they represent what the customers have really experienced. Typically, the data can be extracted from software data sources 160. Moreover, the data can be formatted according to the XES format for process mining. The important point is to be able to group the touchpoints from the same journey together (using a journey identifier). XES format can store customer journeys. Next, the screenshot 1200 can display the five actual journeys 1206 from the event logs on a journey map or trace. Although five journeys can still be considered as a limited number of journeys that can display behaviors. This can reduce the complexity and looks at these journeys at a higher level of abstraction. Specifically, a representative journey 1208 is a single pattern of activities whose purpose is to summarize similar actual journeys, which is a technique useful for characterizing typical trajectories. This shows how the usage of two representative journeys 1208 helps in reducing a journey map's or trace's complexity. As it can be seen, each actual journey is assigned to its closest representative journey, e.g., the darker representative journey summarizes the actual journeys 2 and 5. In this regard, finding representative journeys can be considered as a clustering task by platform 100.

Finding representative journeys involves platform 100 choosing the right number of journeys and finding a sequence of activities that summarizes the actual journeys well. Moreover, the results can depend on the underlying motivation for building the journey map in the first place. For instance, if the goal is to have a general overview of the actual journeys, there may be a different journey map than if the goal were to investigate peculiar arrangements of touchpoints. Finally, one may wish to find groups of similar customers solely based on their trajectories (i.e., the sequence of touchpoints), or based on their characteristics (e.g., age and region), or most probably, on a continuum between these two extremes.

Given the challenges surrounding the desire to increase the understanding of customer behavior, the platform 100 can be configured for clarifying the customer journey discovery activity, proposing ground truth datasets, which are particularly suited for evaluating this activity, and introducing a process to discover representative journeys. Using the proposed datasets and existing cluster analysis techniques, platform 100 can generate traces automatically in a flexible nature using a real dataset and illustrate the results at interface application 130.

The customer journey discovery activity can be described with the following definition: given a set of actual journeys, find a reasonable amount of representative journeys that well summarizes the data. The following table provides a summary of notation:

TABLE 1

Summary of the notation.

| | |
|---|---|
| t | touchpoint |
| \|T | finite set of all touchpoints |
| S | nonempty and ordered set of touchpoints |

TABLE 1-continued

Summary of the notation.

| | |
|---|---|
| C | set of contextual data |
| c | name of contextual data |
| # c | nominal value of contextual data |
| $J_a$ | an actual journey observed from a customer |
| $J_\mathcal{A}$ | event logs, set of all the actual journeys |
| $J_r$ | a representative journey summarizing a subset of $J_\mathcal{A}$ |
| $J_\mathcal{R}$ | customer journey map, a set of $J_r$ summarizing $J_\mathcal{A}$ |
| $k_\mathcal{R}$ | number of $J_r$ in $J_\mathcal{R}$; i.e., $\|J_\mathcal{R}\|$ |
| $\mathcal{T}_\mathcal{A}$ | set of all the S observed in event logs |
| $\mathcal{T}_\mathcal{R}$ | set of all the S obtained in $J_\mathcal{R}$ |
| $\mathcal{C}_\mathcal{A}$ | set of all the C observed in event logs |
| $\mathcal{C}_\mathcal{R}$ | set of all the C contained in $J_\mathcal{R}$ |

A touchpoint is an interaction between a customer and a company's products or services. 'Sharing on social network' or 'ordering a product on the website'—two activities visible in FIG. 12—are two typical examples of touchpoints in a retail context. 'Visiting the doctor', or 'taking medication' are other possible examples in a healthcare context. Let t be a touchpoint, and let T be the finite set of all touchpoints.

Ordered Set of Touchpoints involves one or more touchpoints. When consuming a service, a customer will have a trajectory composed of one or more touchpoints. Let $S=t_1, t_2, \ldots$; $t \in T$ be a set of ordered touchpoints. For instance, at 1204 the first journey starts with 'visiting the shop', followed by 'testing the product', and finally 'sharing on social network'.

Contextual data is the data that holds contextual information relevant during the service delivery. Typically, customers' demographics or the level of satisfaction of the customers are examples of contextual data. For instance, we might discover that certain trajectories are more popular amongst younger customers. In this case, it would constitute important information for the marketing team in order to better anticipate and communicate with this segment of customers. The intuition is that discovering trajectories that can be described by particular contextual data (e.g., the trajectories of younger customers from the 'region A') provide more insights than finding representatives that are uniformly distributed amongst all customers' profile. Hence, adding the contextual data in the journey allows to consider it when trying to find the best representative journey. Let C be a set of all available contextual data. Let the name of the contextual data be c E C and let #c be its nominal value.

An actual journey $J_a$ can be a tuple (S, C); i.e., an actual journey is a nonempty and ordered set of touchpoints and a set of contextual data. For instance, $J_a=\{<$'Visiting the shop', 'Testing the product', 'Sharing on social network'>, {subscription-type:standard}, {age-range:young}} is a journey with three touchpoints from a young customer having a standard subscription.

$J_A$ can refer to an event log, the set of all actual journeys observed from customers.

A representative journey summarizes a subset of $J_A$. Let this subset be $J_A$. Let a representative journey $J_r$ be a triplet (S, C, $J_A \subseteq J_A$); i.e., a representative journey is a nonempty and ordered set of touchpoints, and a set of contextual data, which summarizes a subset of $J_A$. At 1208 there is shown two representative journeys summarizing five actual journeys. As can be seen, the lighter representative journey ⟨BDAE⟩ represents the actual journeys ⟨BDA⟩, ⟨BDAE⟩, and ⟨BDE⟩.

A customer journey map is a conceptual tool used to provide an overview of the customer experience through the use of representative journeys. It contains one or several representative journeys. Let a customer journey map JR be the superset of all the $J_r$. Let $k_R$ denotes the number of journeys on a map (i.e., $|J_R|$).

Finally, for readability purposes, let $\sigma_A = \{S: S \in J_a, J_a \in J_A\}$ and $\sigma_R = \{S: S \in J_r, J_r \in J_R\}$; i.e., $\sigma_A$ is the set of all the sequences of activities observed from customers, while $\sigma_R$ is the set of all the sequences of activities displayed on a customer journey map. Similarly for contextual data, let $\kappa_A = \{C: C \in J_a, J_a \in J_A\}$ and $\kappa_R = \{C: C \in J_r, J_r \in J_R\}$.

The customer journey discovery activity can be defined as a function that maps all members of $J_A$ to a member of $J_R$; i.e., that maps all the actual journeys to representative journeys ultimately displayed on a journey map. Note a journey $J_a$ is assigned to a single representative journey in $J_R$.

Discovering $J_R$ from $J_A$ is an unsupervised clustering task implemented by clustering engine. The platform 100 determines a parameter for the number of $k_R$. When the goal is to have a general overview about $J_A$, it seems reasonable to have $k_R$ in a range from two to six journeys so the journey map is readable but this can vary. However, discovering few dozens $J_r$ might also be a relevant choice if the goal is to catch complex and less generic patterns. Once $k_R$ has been found, the another interesting challenge lies in the fact that $J_a$ is two-dimensional. Indeed, both S and C can be taken in consideration when clustering the journeys. Finally, the sequence S∈Jr that best summarizes its assigned actual journeys needs to be found. It might be the case that an ideal representative journeys was never observed but well summarizes the actual journeys.

The platform 100 uses a hierarchical structure so that the first layers show only the most important activities, abstracting from less important ones. The platform 100 can explore without any a priori information, but it is also possible to set goals based on journey characteristics (e.g., age and gender). Once the goals are set, areas of interest (i.e., the ones fulfilling the goal) are highlighted at interface application 130. In platform 100, the dendrogram is built based on the edit distance between journeys. The platform 100 can also leverage the contextual information when finding representatives.

Figure 13:
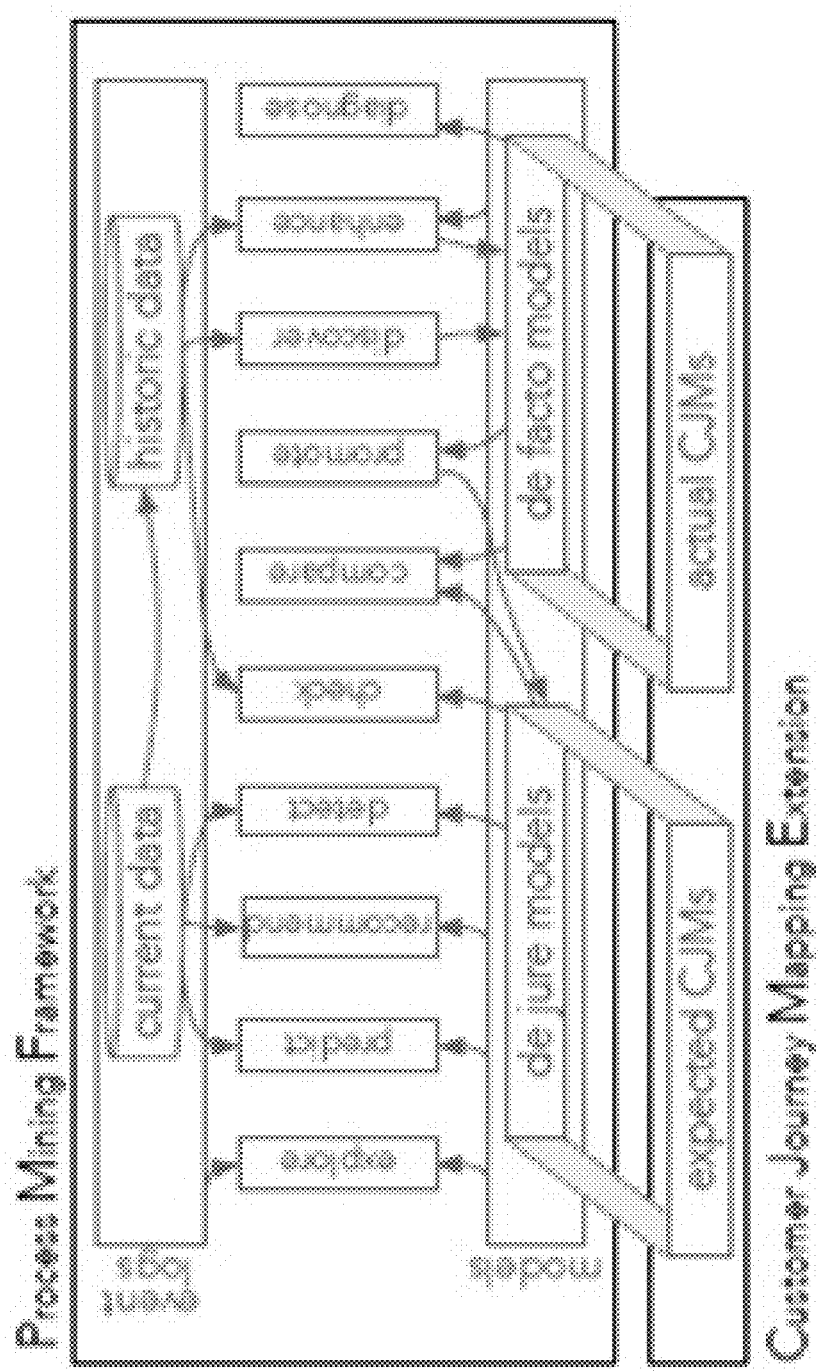
FIG. 13 is a diagram that shows that the process mining framework as well as the input data are relevant in a customer journey analytics context.
Figure 14:
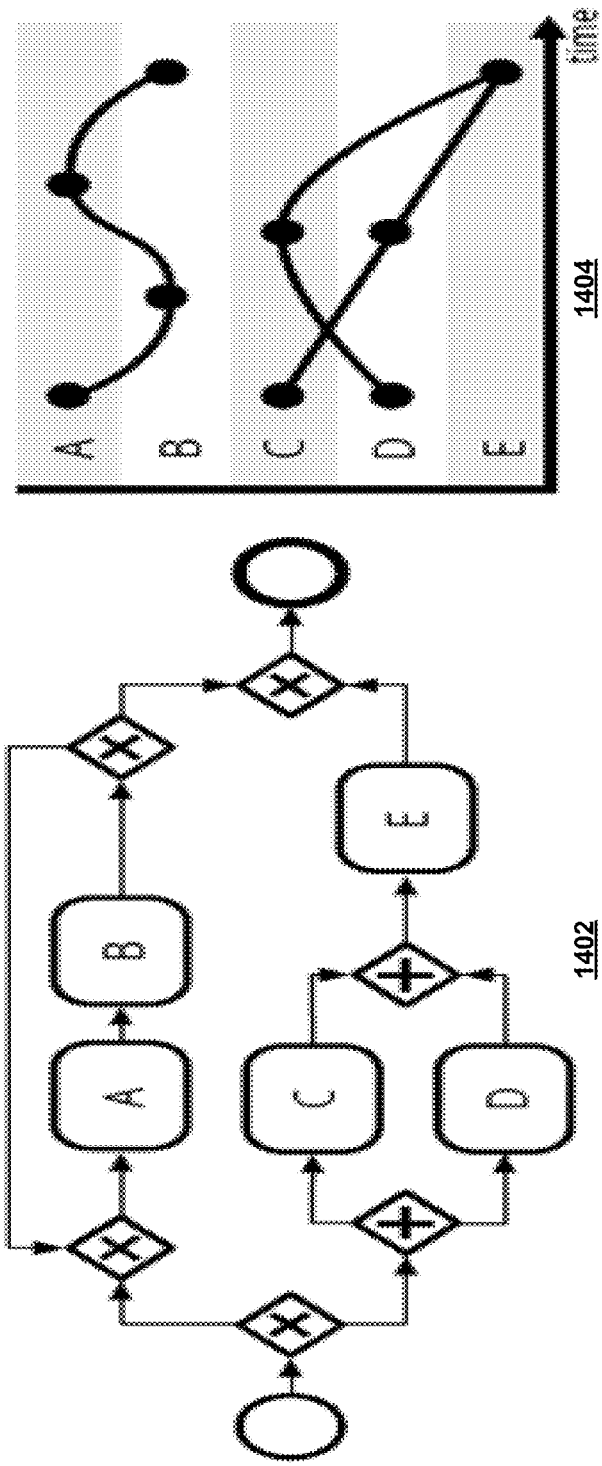
FIG. 14 shows that these business process model (BPM) and journey maps convey different information.

FIG. 13 is a diagram 1300 that shows that the process mining framework as well as the input data are relevant in a customer journey analytics context. Similar to the process discovery activity in process mining, platform 100 focuses on the discovery of a model from event logs. FIG. 14 shows that these business process model (BPM) 1402 and journey maps 1404 convey different information. A journey map depicts journeys as experienced by customers while a BPM shows the available combination of activities using advanced constructs such as XOR or parallel gateways. Finally, the information that will be leveraged for a journey map differs from that used for a BPM. For instance, the satisfaction, the emotion, and various customer characteristics are central pieces of information that should be leveraged when discovering a journey map. Such information might sporadically be used to enhance a BPM, but usually only once the model has been discovered.

The platform 100 can summarize a set of events using representative sequences summarizing a set of sequences. There are different ways to select a representative. The 'frequency', where the most frequent event is used as the representative. The 'neighborhood density', which consist of counting the number of sequences within the neighborhood of each candidate sequence. The most representative is the one having the largest number of sequences in a defined neighborhood diameter. The 'mean state frequency': the transversal frequencies of the successive states is used to find a representative using the following equation:

$$MSF(s) = \frac{1}{\ell}\sum_{i=1}^{\ell} f_{si} \qquad (1)$$

where $s=s_1 s_2 \ldots s_l$: Sequence of length $f_{s1}, f_{s2}, \ldots, f_{sl}$: Frequencies of the states at time $t_i$ The sum of the state frequencies divided by the sequence length becomes the mean state frequency. Its values is bounded by 0 and 1 where 1 describes a situation where there is only one single distinct sequence [9]. The sequence with the highest score is the representative. The 'centrality': the representative—or medoid—can be found using the centrality. Being the most central object, the representative is the sequence with the minimal sum of distances to all other sequences. Finally, the 'sequence likelihood': the sequence likelihood of a sequence derived from the first-order Markov model can also be used to determine the representative.

The platform 100 can use genetic approach that uses contextual data and can be an extension to the summarization of categorical sequences.

Figure 15:
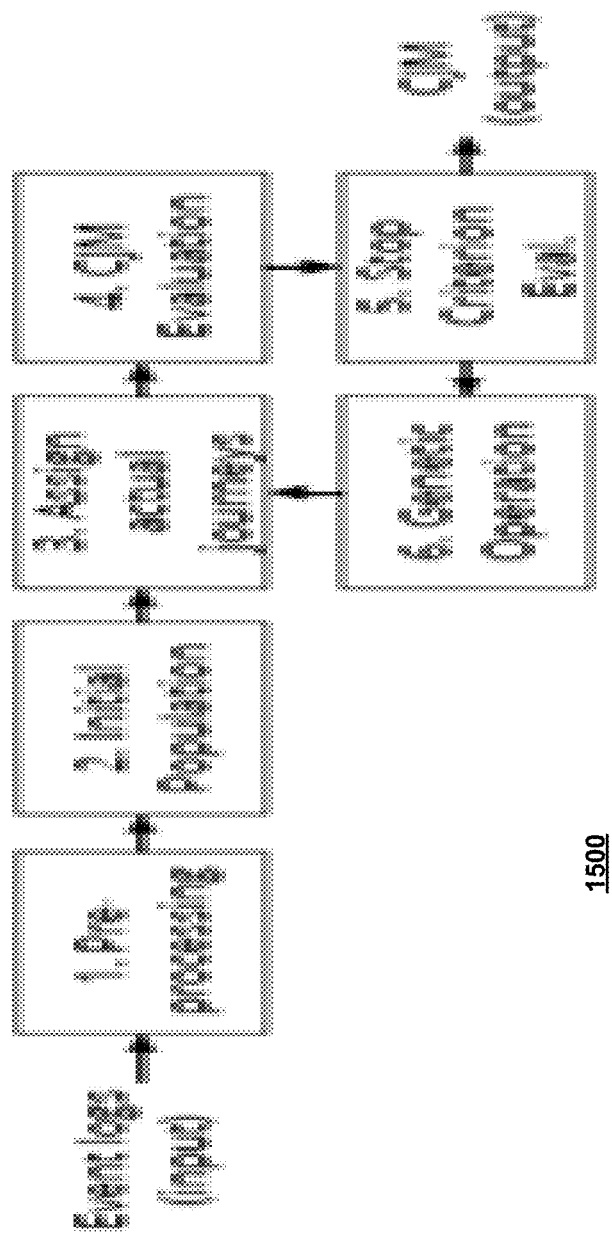
FIG. 15 depicts phases of determining a representative journey.

The platform 100 can use genetic approaches to discover business process models from event logs. The platform 100 tailors it towards journey map by introducing specific evaluation metrics suited to measure the quality of a journey map and its representative journeys given a set of actual journeys. FIG. 15 depicts the main phases 1500: (1) a preprocessing phase, (2) generating the initial population, (3) assigning each actual journey to its closest representative, (4) evaluating the quality of the journey maps, (5) the stopping criterion evaluation, and (6) creating new journey maps by applying some genetic operations.

Figure 16:
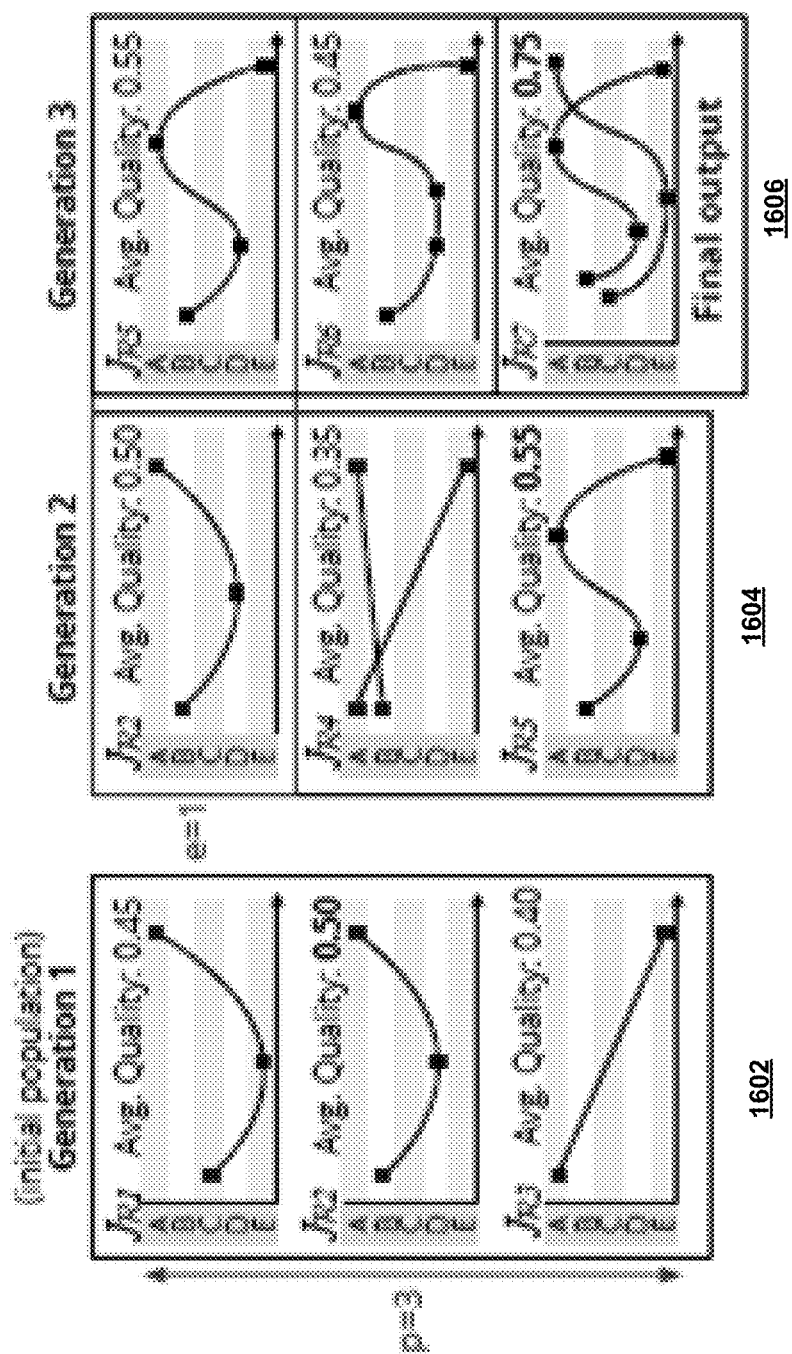
FIG. 16 provides an overview of an example genetic process.

As an introduction, FIG. 16 provides some intuitions on the genetic process. Typically, a set of actual journeys, $\sigma_A$, is provided to the algorithm. First, during Generation 1 1602, the platform 100 can build p number of $J_R$, where p is the population size; i.e., the number of $J_R$s that will be evaluated after each generation. In our example p=3. Each $J_R$ is evaluated and we keep the e best $J_R$s, called the elite set while we discard the other (p−e) $J_R$s. Then platform 100 can move to generation 2, 1604 where it can keep an untouched version of the e number of $J_R$s in the elite set. In FIG. 16, if e=1, platform 100 can keep the best $J_R$ from generation 1, i.e., $J_{R2}$ is intact in generation 2. The platform 100 can then apply some transformation to generate (p-e) new $J_R$s that will, in turn, be evaluated. The platform 100 can generate $J_{R4}$ and $J_{R5}$. The platform 100 can recursively transform and evaluate the p number of $J_R$s until a stopping criterion is met. Once a stopping criterion is met, we return the best $J_R$ ($J_{R7}$ in FIG. 16 at generation 3 1606). The best $J_R$ can be interpreted as the best set of representative journeys, $J_r$, representing a set of journeys from $J_A$ that have been found given certain evaluation criterion. The platform 100 can generate the initial population, apply various types of operations on each $J_R$ to transform them, and evaluate each one of them given a set of journeys in $J_A$.

The platform 100 can make the assumption that $\sigma_R$ will be close to the frequent patterns observed in $\sigma_A$.

Figure 17:
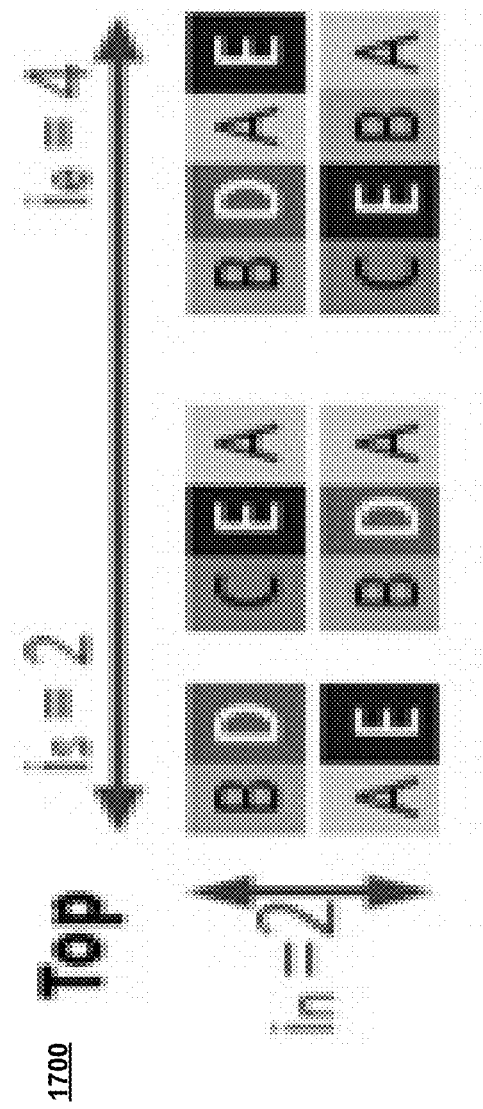
FIG. 17 depicts Top from the example given in FIG. 16.

Let $\sigma_{Al}$ be the set of all actual journeys of length l and let $\text{Top}_l = \{\text{Top}_l \in \sigma_{Al}, |\text{Top}_l| = \min(|\sigma_{Al}|, i_n)\}$ be the $i_n$ most occurring pattern of length L. Finally, let $\text{Top} = \{\text{Top} \supseteq \text{Top}[i_s, i_e]\}$, i.e., Top is the superset of all the most occurring patterns of lengths $i_s$ to $i_e$. FIG. 17 depicts Top 1700 from the running example given in FIG. 16.

```
Input    :σ_A, actual journeys
         p, population size
         e, elite size
         setQuality, set of quality criteria
Output:J_R, best customer journey map
  // STEP 1:Preprocessing
1 Top ← findTopPattern(σ_A)
  // STEP 2: Initial population
2 setCjm ← Array( )
3 for i ← 0 to p do
4 |  M ← pickRandom(Top)
5 |  setCjm.add(J_R)
6 end
7 nextPopulation(setCjm)
8 Function nextPopulation (setCjm)
9 |  foreach J_R in setCjm do
  |  |  // STEP 3: Assign actual journeys
10 |  |  assignToClosestRepresentative(J_R, σ_A)
  |  |  // STEP 4: Representatives evaluation criteria
11 |  |  evaluateQuality(J_R, setQuality)
12 |  end
  |  // STEP 5: Stopping criterion
13 |  if stopCriterionMet(setCjm) then
14 |  |  return topRepresentative(setCjm, 1)  // END; return best cjm
15 |  else
  |  |  // STEP 6: Genetic operation
16 |  |  elite ← topRepresentative(setCjm, e)  // return e best cjms
  |  |  setNextCjm ← elite
17 |  |  for i ← 0 to p do
18 |  |  |  M ← pickRandom(elite)
19 |  |  |  setNextCjm.add(J_R)
20 |  |  end
21 |  |  nextPopulation(setNextCjm)
22 |  end
```

Top is used later to form the initial population of $J_R$, and to add a random journey to $J_R$. Using Top the platform 100 can avoid generating journeys by picking a random number of touchpoints from T. Using Top can reduce the execution time by two to get an output $J_R$ of the same average quality. For an example, platform 100 can fix $i_n$ to 10, $i_s$ to 2, and $i_e$ to 12.

To build the initial population platform 100 can generate p number of $J_R$ on which we add one sequence randomly picked from Top (defined in Sect. 4.1). This is visible in the genetic process shown, lines 2 to 5. As can be seen in FIG. 16, $k_R=|J_{R1}|=|J_{R2}|=|J_{R3}|=1$ because platform 100 can only add one sequence per $J_R$.

To evaluate how good $J_R$ describes $J_A$, platform 100 can decompose the problem. Indeed, the quality of $J_R$ can be based solely upon its representative journeys. And, the quality of a representative journey can be measured when knowing which actual journeys it represents. Hence, a first step toward evaluating the quality of $J_R$ is to assign each journey $J_a \in J_A$ to its closest journey in $J_r \in J_R$. This is illustrated in FIG. 12 at 1208 where each journey $J_a$ is assigned to a journey $J_r$.

To characterize the closeness between $J_a$ and $J_r$, platform 100 can use the Levensthein distance. It is a metric to measure the distance between sequences. The Levensthein distance counts the number of edit operations that are necessary to transform one sequence into another one. There are three types of operations: deletions, insertions, and reversals (or substitutions). For instance, the distance between <ABC> and <ACCE> is 2 since one substitution and one insertion are required to match them.

The platform 100 can define the closest representative as the one having the smallest Levensthein distance with the actual journeys. Note that if a tie occurs between multiple best representatives, platform 100 can assign the $J_a$ to the $J_r$ having the smallest amount of actual journeys already assign to it. Moreover, when $k_R=1$ all the $J_a$ will be assigned to the same $J_r$. This be the case after creating the initial population because only one $J_r$ is added to $J_R$.

Once each actual journey has been assigned to its closest representative, platform 100 can evaluate $J_R$ using the criteria described in the next section.

Figure 18:
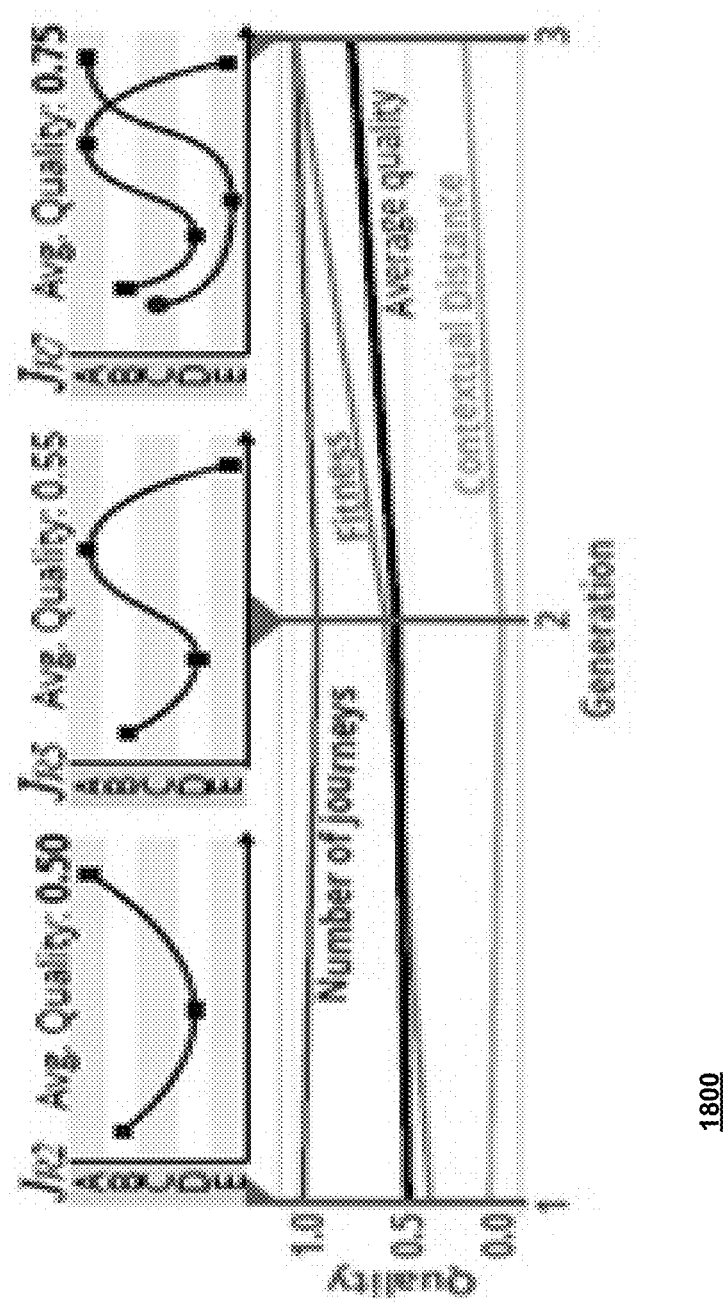
FIG. 18 illustrates the evolution of the evaluation criteria.

The platform 100 can use different evaluation criteria to determine the quality of each $J_R$, namely, (1) the fitness, (2) the number of representatives, (3) the contextual distance, and (4) the average quality. Using the example in FIG. 16, FIG. 18 illustrates the evolution 1800 of the evaluation criteria for the best $J_R$.

The fitness measures the distance between each sequence of activities $\sigma_A$ and its closest representative $\sigma_R$ using the Levenshtein distance.

$$\text{Fitness}(\sigma_A, \sigma_R) = 1 - \frac{\sum_{i=1}^{|\sigma_R|} \min_{j=1}^{|\sigma_R|} \left(\text{Levensthein}(\sigma_{A_i}; \sigma_{R_j})\right)}{\sum_{i=1}^{|\sigma_A|} \text{Length}(\sigma_{A_i})} \quad (2)$$

where $\sigma_{A_i}$ : $i^{th}$ actual sequence observed in event logs $\sigma_{R_j}$ : $j^{th}$ representative contained in $J_R$ Levensthein($x_1,x_2$): Levensthein distance between two sequences Length(x): Length of the sequence of activity x A fitness of 1 means that the representative journey perfectly catches the behavior of the actual journeys assigned to it. In contrast, a fitness close to 0 implies that many edit operations are necessary to match the sequences.

Another evaluation criteria is the number of representatives. An event log can contain several hundreds or thousands of unique actual journeys. Hence, if platform 100 maximizes the fitness without trying to keep a low $k_R$, the journey map can become unreadable because too many representative journeys may be displayed on it. In other words, $J_R$ overfits. Hence, the goal is to find a $k_R$ that offers a good compromise between underfitting and overfitting. Finding the optimal number of clusters is a recurrent challenge when clustering data. The platform 100 can involve integrating different ways of determining the ideal number of clusters, such as the Bayesian information criterion, the Calinski-Harabasz index, or the Silhouette technique. The idea is to evaluate a range of solutions (e.g., from 2 to 10 journeys) and to keep the best solution. Let $k_h$ be the ideal number of clusters returned by one of the three techniques mentioned above. By integrating $k_h$ into the evaluation, platform 100 can guide the solution toward a $k_R$ that is statistically relevant. To evaluate the quality, platform 100 measure the distance between $k_R$ and $k_h$. To do this, platform 100 can use the following example distribution function:

$$NumberOfRepresentatives(k_R, k_h, x_0) = \frac{1}{1 + \left(\frac{|k_R - k_h|}{x_0}\right)^2} \quad (3)$$

where $k_R$ : Number of $J_r$ journeys $J_R$ (i.e. $|J_R|$)

$k_h$: Optimal number of journeys (e.g. using the Calinski-Harabasz index)

$x_0$: x value of the midpoint

Figure 19:
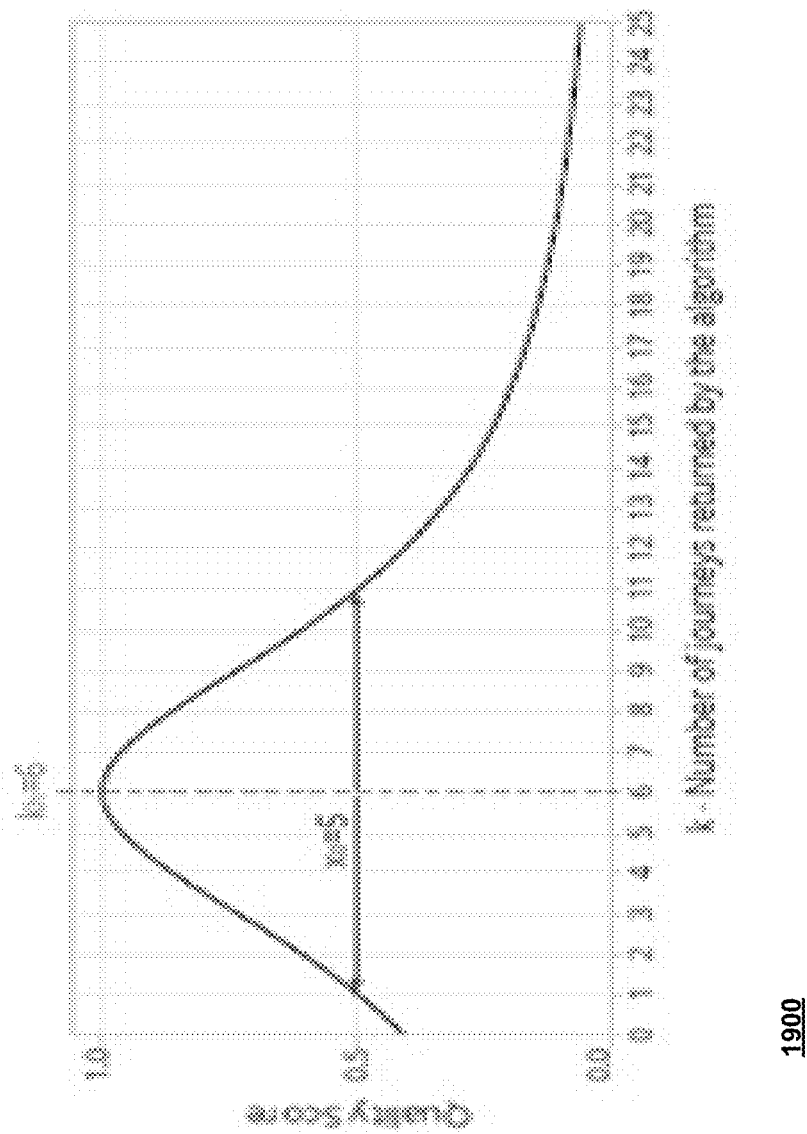
FIG. 19 illustrates a graph of the distribution.

FIG. 19 illustrates a graph 1900 of the distribution for $k_h$=6 and $x_0$=5. For instance, if $k_R$=2, it would have a quality of ≈0.6. Also note that the parameter $x_0$ determines where the midpoint of the curve is. Concretely, $k_R$=1 or $k_R$=11 can result in a quality of 0.5 because the absolute distance from $k_h$ is 5. The platform 100 set $x_0$=5 for experiments.

Figure 20:
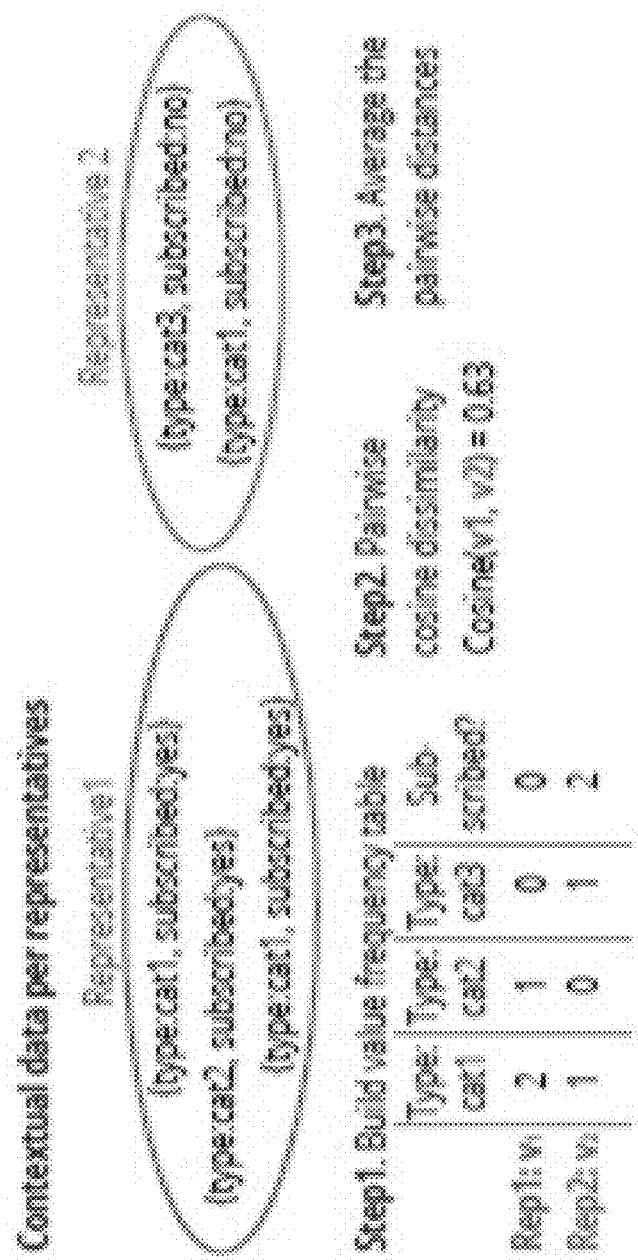
FIG. 20 illustrates a value frequency table.

The contextual distance allows platform 100 to consider the set of contextual data C when grouping similar journeys. The more distant the set of contextual data is between $J_a$ that are represented by distinct $J_r$, the better the quality is. To measure the distance, platform 100 can first build a value frequency table which count all the values per representatives (see FIG. 20). Then, for each pair of clusters, platform 100 can calculate the cosine similarity, which is defined as:

$$ContextualDistance(v_1, v_2) = \frac{v_1 \cdot v_2}{\|v_1\| \cdot \|v_2\|} \quad (4)$$

where $v_1$: Value frequency counter $J_{r1}$
$v_2$: Value frequency counter $J_{r2}$ Finally, the cosine distances are average to get the overall contextual distance. A short overall distance indicates that the contextual data of Ja that are assigned to distinct Jr are similar. In other words, the contextual data does not help in classifying Ja between several Jr.

The quality criteria can be weighted by platform 100. Then, platform 100 can average the overall quality as follows:

$$AvgQuality(w_f, w_{k_h}, w_c) = \frac{(F * w_f) + (N + w_{k_h}) + (C * w_c)}{w_f + w_{k_h} + w_c} \quad (5)$$

where

F: Fitness quality
N: $k_h$ quality
C: Contextual Distance quality
$w_f$: Weight for the quality criteria 'fitness'
$w_{k_h}$: Weight for the quality criteria 'number of representatives'
$w_c$: Weight for the quality criteria 'contextual Distance'

A weight of 0 skips that criterion. The results can be best if more weight is given to the fitness quality. Typically, weights $w_f$=5, $w_{kh}$=1, and $w_c$=1 lead to the best results both for the synthetic datasets and during our experimentation with a real dataset.

Once all the $J_R$ from p have been evaluated, platform 100 can rank them by decreasing quality.

Before creating new $J_R$, platform 100 can make sure that a stopping criterion is not met. There are three example evaluation criteria the platform 100 can use to stop: (1) The platform 100 could stop after a certain number of generations. (2) platform 100 could stop when a certain number of generations have been created without improving the average quality. (3) platform 100 could stop when a certain quality threshold is reached for one of the evaluation criteria. Because it is difficult to predict the quality level that can be reached, platform 100 might not stop using a threshold. For this reason, platform 100 can use a combination of approaches.

Once the stopping criteria have been evaluated, there are two outcomes. Either one of the criteria is met and the platform 100 stops, returning the best $J_R$ (algorithm 1, line 14), or, platform 100 generate new candidates by recursively calling the function nextPopulation of the algorithm 1 (line 21). How platform 100 generates new candidates is described herein.

Once all the journey maps have been evaluated, platform 100 can rank them by their average quality and copy a fraction (i.e., e) of the best ones. Because platform 100 can keep an untouched version of the e number of $J_R$s, platform 100 can make sure that the overall quality will only increase or stay steady. Indeed, as can be seen in FIG. 18, the average quality (i.e., black line) is never decreasing.

Then, platform 100 can generate (p-e) new $J_R$s as follows. The platform 100 can pick one random $J_R$ from elite, and perform one or multiple operations. The platform 100 can define four different operators: (1) add a journey, (2) delete a journey, (3) add a touchpoint, and (4) delete a touchpoint. The way they are applied is determined using algorithm 2. In extreme cases, platform 100 might execute each of these four operators three times. In any case, platform 100 perform at least one operation (enforced by line 2 in Alg. 2). Typically, in FIG. 16, $J_{R4}$ have been produced by taking $J_{R2}$ and applying two operations: (1) removing the touchpoint D', and (2) adding a journey picked from Top.

A sequence is randomly picked from Top and added to $J_R$. For instance, in FIG. 16, $J_{R7}$ has been produced by taking $J_{R5}$ from Elite and adding a journey from Top.

A random journey is removed from $J_R$. Nothing happens if $J_R$ contains only one journey.

A touchpoint from T is added to one of the journeys from $J_R$ at a random position. For instance, in FIG. 5, $J_{R6}$ has been produced by adding the touchpoint D' at the second position of $J_{R5}$.

A touchpoint is removed from $J_R$ unless removing this touchpoint would result in an empty set of touchpoints. The following shows application of the genetic operations.

```
1  transformed ← False:
2  while transformed == False do
3  |   for i ← 0 to 2 do                              // Loop 3 times
4  |   |   if randFloat(.0, 1.) <= .1 then            // 10% chance
5  |   |   |   addJourneyFromTop( )
6  |   |   |   transformed ← True
7  |   |   end
8  |   |   if randFloat(.0, 1.) <= .1 then            // 10% chance
9  |   |   |   if |M| > 1 then                        // avoid CJM without $J_r$, $J_R$
10 |   |   |   |   deleteRandomJourney( )
11 |   |   |   |   transformed ← True
12 |   |   |   end
13 |   |   end
14 |   |   if randFloat(.0, 1.) <= .1 then            // 10% chance
15 |   |   |   journey ← pickRandomJourney( )
16 |   |   |   journey.addRandomTouchpoint( )
17 |   |   |   transformed ← True
18 |   |   end
19 |   |   if randFloat(.0, 1.) <= .1 then            // 10% chance
20 |   |   |   journey ← pickRandomJourney( )
21 |   |   |   if |journey| > 1 then                  // avoid $J_r$ without tochpoint
22 |   |   |   |   journey.deleteRandomTochpoint( )
23 |   |   |   |   transformed ← True
24 |   |   |   end
25 |   |   end
26 |   end
27 end
```

As described in FIG. 15, once new $J_R$s have been created, platform 100 can go back to the evaluation phase where the new $J_R$s are evaluated until one stopping criterion is met. If such a criterion is met, platform 100 can return the best $J_R$s of the last generation (e.g., $J_{R7}$ in FIG. 16), putting an end to the execution.

In order to evaluate the quality of the approach to return the best set of representative journeys in JR, platform 100 can evaluate the results using a collection of synthetic datasets. The platform 100 can generate the dataset. Then, using this synthetic dataset, platform 100 can evaluate and compare to summarize sequences of categorical data. In this first evaluation, platform 100 does not leverage contextual data to allow for a fair comparison that consider only the sequence of activities. Finally, platform 100 can add contextual data to show the gain in information the platform 100 can get from leveraging such data.

To evaluate the results of the approach, platform 100 can produce several event logs that simulate journeys. The platform 100 can generate the event logs using the ground truth represented by the generative journeys and recover these journeys from a set of actual ones it produces. A generative journey is a known sequence of activities with a known set of characteristics from which we generate the event logs. Similar to $J_a$, a generative journey Jg is a tuple (S, C), containing a nonempty and ordered set of touchpoints, S, and a set of contextual data, C. Let $J_G$ be a set of $k_G$ generative journeys used to generate a dataset composed of 1,000 actual journeys. Let $\sigma_G = \{S: S \in J_g, J_g \in J_G\}$; i.e., $\sigma_G$ is the set of all the sequences defined in the generative journeys.

Figure 21:
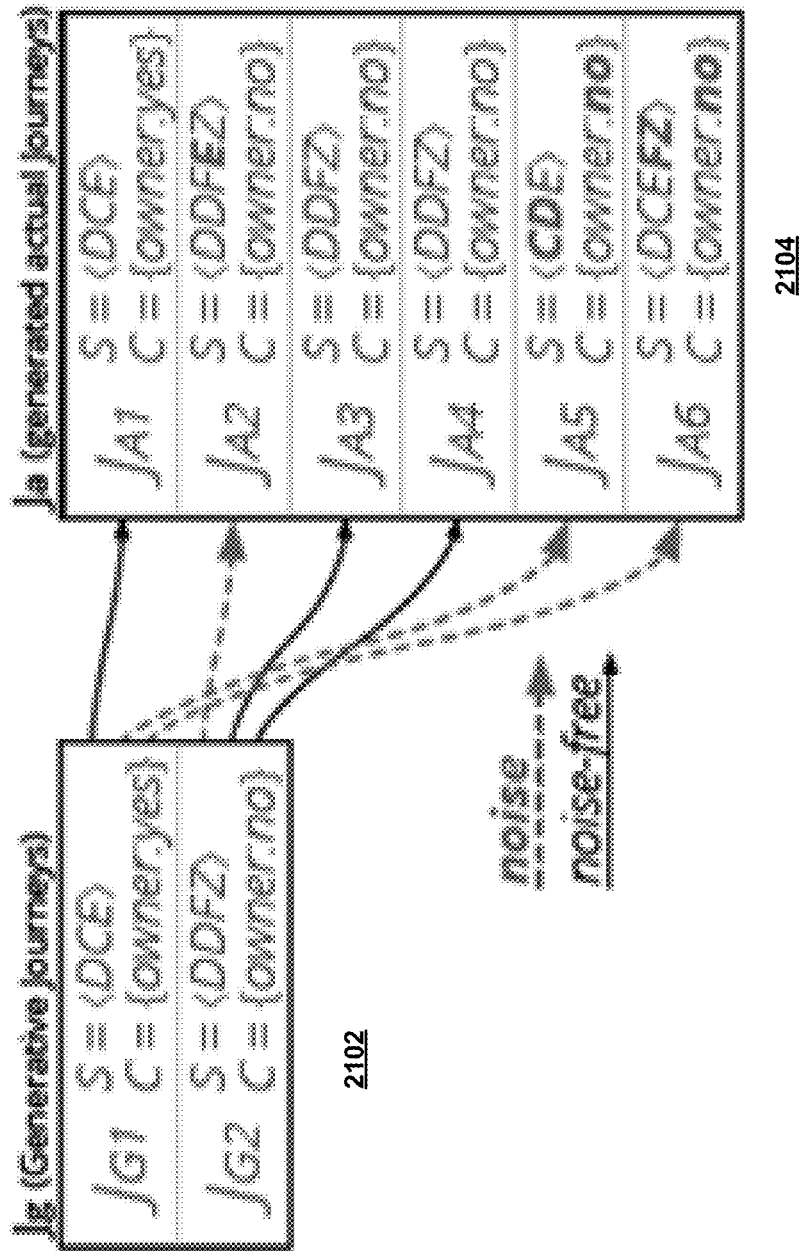
FIG. 21 illustrates how six journeys are generated from two generative journeys.

If platform 100 were to use only these generative journeys to generate 1,000 thousand journeys, platform 100 would obtain only $k_G$ distinct journeys. For instance, if platform 100 uses $j_{g1} = \{<ABC>, \{age\text{-}range\text{:}range1\}\}$ and $j_{g2} = (<ABBD>, \{age\text{-}range\text{:}range2\})$ to generate 1,000 journeys equally distributed, we will obtain $j_a = \{j_{g1}^{500}, j_{g2}^{500}\}$. From a business point of view, this would describe an ideal situation where each group of customers behaves in an homogeneous way. A more realistic situation would depict a scenario where each group of customers can be described by a representative sequence of activities, but the actual journeys within the group can deviate from the representative one. To produce more realistic data, platform 100 can inject noise for a fraction of the journeys. For instance, if the noise level is set to 50%, $J_a = J_g$ is true for half of the data. For the other half, algorithm 3 describes how noise is added. Since the noise is added to the two components of the journey, there are two parts: the sequence of touchpoints and the contextual data. FIG. 21 illustrates how six journeys 2104 are generated from two generative journeys 2102. If we assume that the noise level is defined to be 50%, three actual journeys in the events logs deviate from the original generative journeys. The following shows operations for adding noise to the sequence of activities (e.g. event traces)

```
 1 initialSequence ← twistedSequence;
   //PART 1: noise added to the sequence of touchpoints
 2 while initialSequence == twistedSequence do
 3  |  for i ← 0 to 5 do
 4  |   |  if randFloat(.0, 1.) <= .2 then      // 20% chance
 5  |   |   |  twistedSequence ← removeRandomActivity( )
 6  |   |  end
 7  |   |  if randFloat(.0, 1.) <= .2 then      // 20% chance
 8  |   |   |  twistedSequence ← addRandomActivity( )
 9  |   |  end
10  |   |  if randFloat(.0, 1.) <= .2 then      // 20% chance
11  |   |   |  twistedSequence ← swapTwoActivity( )
12  |   |  end
13  |  end
14 end
   //PART 2: name added to the contestant data
15 foreach char in characteristics do
16  |  char ← chooseRandomObservedValue( );
17 end
```

The goal of experiments is to retrieve the set of generative journeys, as representatives, from the produced actual journeys. The noisier the dataset is, the more difficult it is to retrieve the generative journeys from the actual journeys. However, the noise is not the only source of complexity. Hence, to ensure complexity-wise diverse datasets, platform 100 can define three additional sources of complexity:

(1) Complex number of touchpoints: The more touchpoints are contained in the generative journeys, the more difficult it is to retrieve them. We define that a journey map possessing 20 or more touchpoints is considered complex.

(2) Complex contextual data: The more similar the contextual data is between generative journeys, the more difficult it will be to distinguish them. Let c be the average contextual distance (defined in Sect. 4.4.3) when there is no noise. We define that if $c \geq 0.25$, we consider the journey as complex.

(3) Complex distribution: If the journeys in the event logs are not well distributed among the generative journeys, it will also be harder to retrieve the original generative journeys. We define that if the standard deviation of the distribution (normalized to 1) is equal to or greater than 0.25, we consider the journey as complex. Typically, if 300 journeys are generated from $J_{g1}$ while 700 journeys are generated from $J_{g2}$, we would consider the journeys as complex (i.e., the standard deviation is 0.283).

The binary combination of these three sources of complexity results in eight different datasets, which are described in Table 2. As can be seen, the first row (i.e., #0) describes a configuration with 4 generative journeys (column 'kG'), a total of 17 touchpoints, a contextual distance of 0.17, and a standard distribution of 0.17 (column 'Distribution'). Hence, we do not consider the row #0 as complex for any of the three complexity mentioned above (column 'Complex'). Combining these 8 configurations with 5 levels of noise produces 40 datasets as an example experiment.

| # | Complex (1) (2) (3) | $k_G$ | Touch-points | Contextual distance* | Distribution (std_dev) |
|---|---|---|---|---|---|
| 0 |  | 4 | 17 | 0.17 | [.10, .10, .30, .50] (.17) |
| 1 |  | 5 | 25 | 0.00 | [.10, .10, .20, .20, .40] (.11) |
| 2 |  | 4 | 17 | 0.33 | [.10, .15, .10, .65] (.23) |
| 3 |  | 3 | 11 | 0.00 | [.10, .10, .80] (.33) |
| 4 |  | 4 | 20 | 0.31 | [.25, .25, .25, .25] (.00) |
| 5 |  | 3 | 13 | 0.25 | [.08, 0.10, 0.82] (.34) |
| 6 |  | 6 | 27 | 0.00 | [.05, .05, .05, .05, .05, .75] (.26) |
| 7 |  | 5 | 21 | 0.25 | [.07, .09, .09, .05, .7] (.25) |

(t = true)
*average of the cosine distance when there is no noise

To evaluate and compare the quality of representative journeys, platform 100 can use both external and internal evaluation metrics. On the one hand, the external ones evaluate the results relative to the ground truth, i.e., from the generative journeys. On the other hand, the internal evaluation uses cluster analysis techniques to assess the results. The aim is to account for the fact that the ground truth might not be the optimal solution. Indeed, adding random noise might change the optimal solution.

An example metric for External Evaluation is Distance in Number of Journeys. This metric measures the distance between the number of generative journeys and the number of representative journeys returned by the algorithm. The platform 100 can use the following metric:

$$\text{NbJourneysDistance}(k_\mathcal{G}, k_\mathcal{R}) = \text{abs}(k_\mathcal{G} - k_\mathcal{R}) \quad (6)$$

An example metric for External Evaluation is Jaccard Distance. To evaluate the distance between the sequences of activities from the generative journeys ($\sigma_G$) and the discovered representative journeys ($\sigma_R$), platform 100 can use the Jaccard Distance where a score of 1 indicates a perfect match between the set of sequences from the generative journeys and the representative ones.

$$\text{JaccardDistance}(\sigma_R, \sigma_G) = 1 - \frac{|\sigma_R \cap \sigma_G|}{|\sigma_R \cup \sigma_G|} \quad (7)$$

An example metric for Internal Evaluation is Mean distance. The mean distance i returns the average distance between the representative sequence i and the sequence of actual journeys that have been assigned to i. If the mean distance i is 0, then the representative journey i perfectly matches the underlying actual journeys.

$$\text{MeanDistanceScore}_i = \frac{\sum_{j=1}^{k_i} D(S_i, S_{ij})}{k_i} \quad (8)$$

where
- $D(x_1, x_2)$: Levensihein distance between two sequences
- $k_i$: Number of actual journeys assigned to the representative journey i
- $S_i$: Representative sequence i
- $S_{ij}$: Sequence of actual journeys j assigned to i An example metric for Internal Evaluation is Coverage. The coverage indicates the proportion of actual journeys that are within the neighborhood n of a representative.

$$\text{Coverage}_i = \frac{\sum_{j=1}^{k_i} (D(S_i, S_{ij}) < n)}{k_i} \quad (9)$$

where
- $D(x_1, x_2)$ Levensthein distance between two sequences
- $k_i$: Number of actual journeys assigned k the representative journey
- $S_i$: Representative sequence
- $S_{ij}$: Sequence of actual journeys j assigned to i An example metric for Internal Evaluation is Distance gain [10]. The distance gain measures the gain in using a representative journey instead of the true center of the set (i.e., the medoid of the whole dataset). In other words, it measures the gain obtained in using multiple representative journeys instead of a single one.

$$\text{DistGain}_i = \frac{\sum_{j=1}^{k_i} D(C(\sigma_\mathcal{A}), S_{ij}) - \sum_{j=1}^{k_i} D(S_i, S_{ij})}{\sum_{j=1}^{k_i} D(C(\sigma_\mathcal{A}), S_{ij})} \quad (10)$$

where:
- $D(x_1, x_2)$ Levensthein distance between two sequences
- $k_i$: Number of actual journeys assigned to the representative journey i
- $s_i$: Representative sequence i
- $s_{ij}$: Sequence of actual journeys j assigned to i
- $C(x)$: True center of the set The platform 100 can evaluate two settings of the genetic algorithm compared to techniques that are used to cluster and summarize sets of sequential and categorical data.

Figure 22:
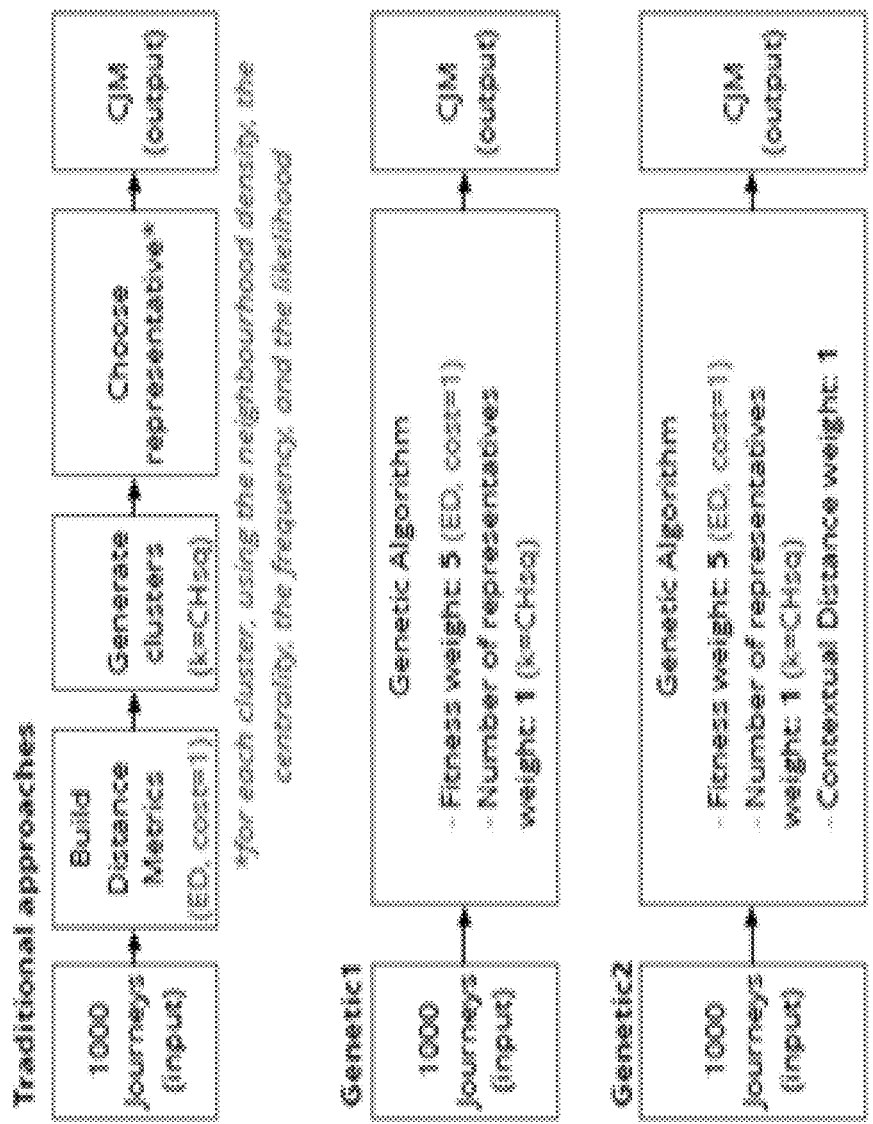
FIG. 22 depicts a clustering process.

FIG. 22 depicts the approach at a high-level. As can be seen, with traditional approaches, a first step is to build a distance metric. This can use the edit distance with a constant cost operation set to 1. Once the distance matrix is built, this can involve creating k clusters. There can be a test using from 2 to 12 clusters and use the squared Calinski-Harabasz index to return the most statistically relevant. Then, we return the best representatives of each cluster using the neighborhood density, the centrality, the frequency, or the likelihood using the package Traminer. These techniques do not use the contextual data. Hence, to allow for a fair comparison, we compare these techniques with a version of our genetic algorithm that does not use contextual data. We call this version Genetic$_1$. We also test our genetic algorithm with a version that considers the contextual data, called Genetic$_2$. The detailed parameters we used are depicted in Table 3. Note that both the traditional and genetic approaches use the same techniques to find $k_h$ (i.e., the squared Calinski-Harabasz index) and the distance is measured using the edit distance with a constant cost operation set to 1. Due to the non-deterministic nature of the genetic algorithm, we run it ten times for each setting.

Figure 23:
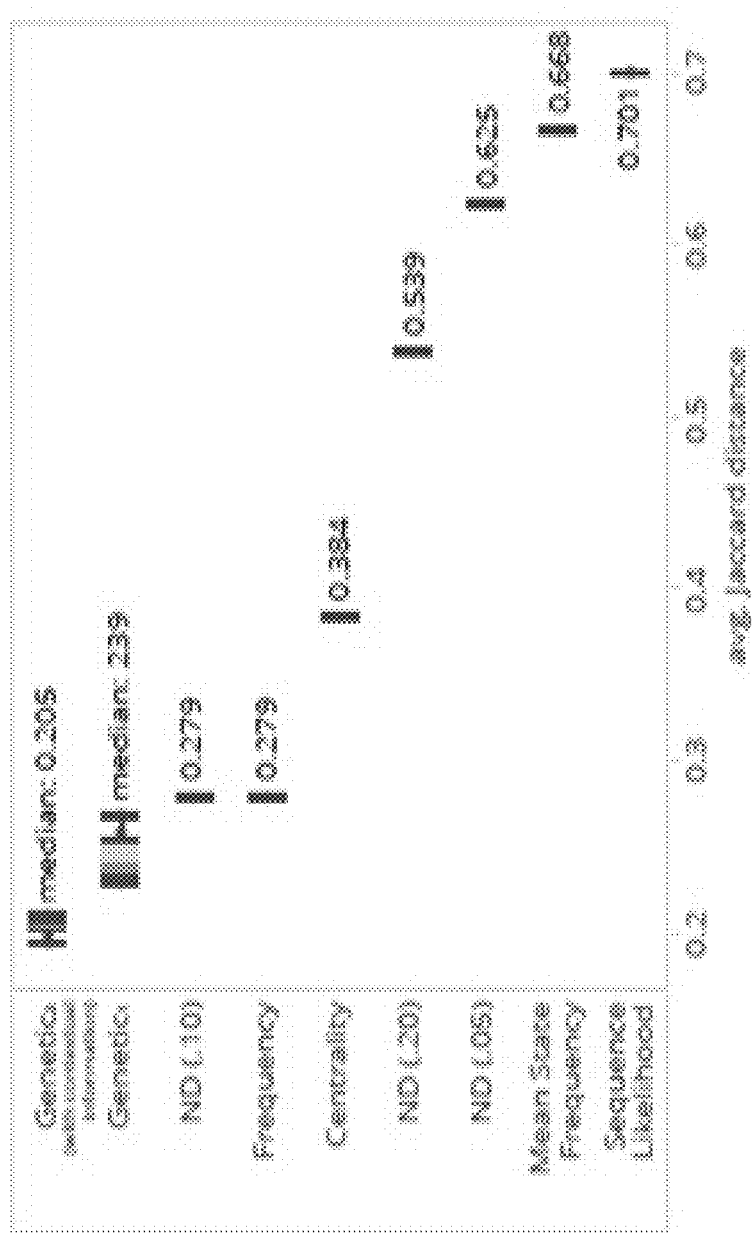
FIG. 23 shows a solution that reduces the Jaccard distance.
Figure 24:
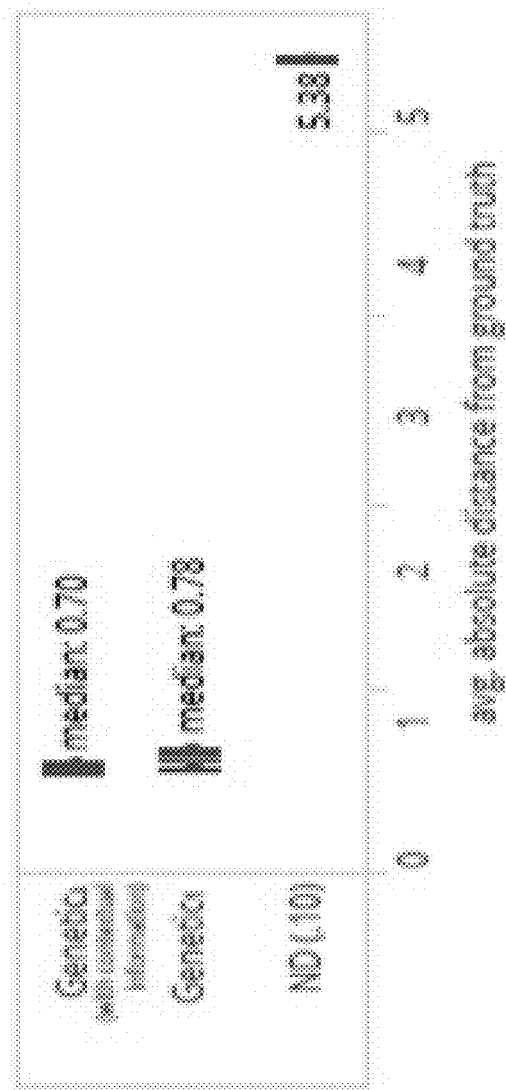
FIG. 24 shows a drop in the average absolute distance in the number of journeys.

The platform 100 can present the results using the external evaluation metrics, then the internal ones. FIG. 23 shows that the solution that reduces the Jaccard distance the most is Genetic$_2$. This is not surprising, as this solution uses more information (i.e., the contextual data). Next, the best solution that does not use contextual data is Genetic$_1$. The drop in the average absolute distance in the number of journeys from the ground truth (which is visible in FIG. 24) might be why the genetic algorithm outperforms the other techniques that solely rely on the Calinski-Harabasz index to determine the ideal number of journeys.

Figure 25:
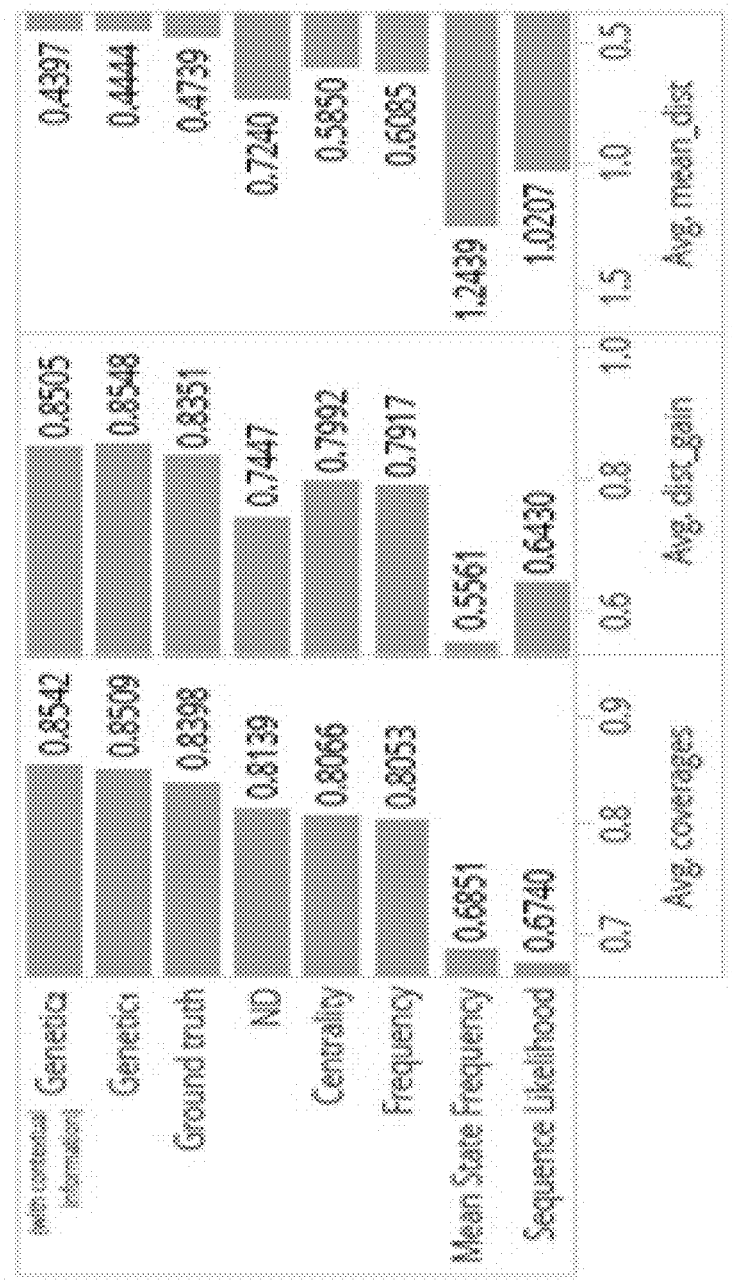
FIG. 25 shows results of the genetic algorithm.

The internal evaluation of FIG. 25 shows that not only does the genetic algorithm outperform the traditional approaches, it also proposes a better solution than the ground truth. This can be explained by the fact that when platform 100 injects noise, its potentially changes the solution.

Figure 26:
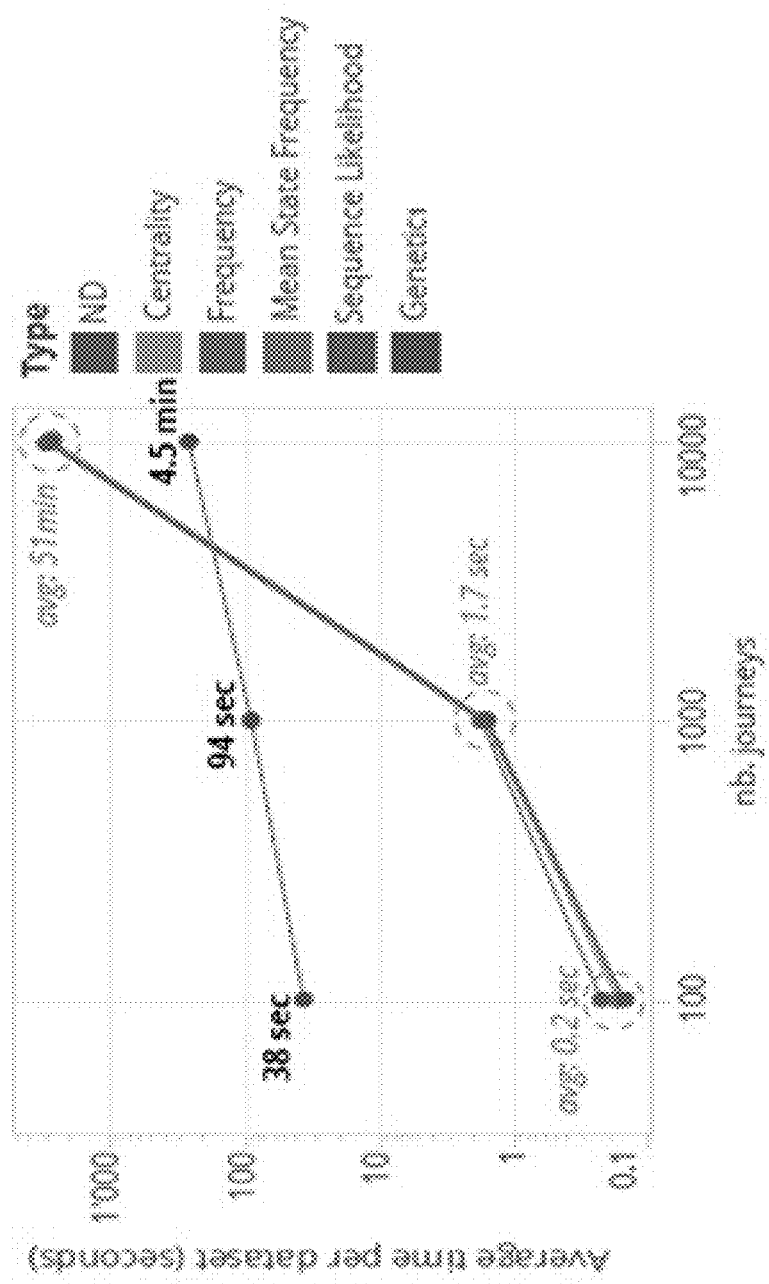
FIG. 26 shows results of the genetic algorithm.

FIG. 26 summarizes the results.

Experiments Using Real Datasets

This section reports on the experiments with a real dataset, the goal being to illustrate how a change in the settings impacts the results. Overall, the main settings are the same as those described in the previous section. That is, the distance between sequences is measured using the edit distance with a constant cost operation set to 1, $k_h$ is tested from 2 to 12 clusters using the squared Calinski-Harabasz index, p is 100, and e is 5. The parameters we adjust are the weight given to the fitness, the number of representatives, and the contextual distance.

We used a publicly available dataset describing the activities performed throughout the day by Chicago's citizens. There are 15 types of activities, such as, 'being at home', 'attending class', 'going shopping', or 'doing households errands'. In the context of this dataset, a journey is the sequence of activities starting from the morning until the night. Typically, 'being at home'→'attending class'→'being at home' is a journey consisting of three activities. The total number of journeys is 29,541 and there are 123,706 activities (with an average of 4.817 activities per journey). This dataset is interesting not only for the relatively large number of data points describing life trajectories, but also because of the available detailed contextual data, such as information on the citizens' demographics.

Figure 27:
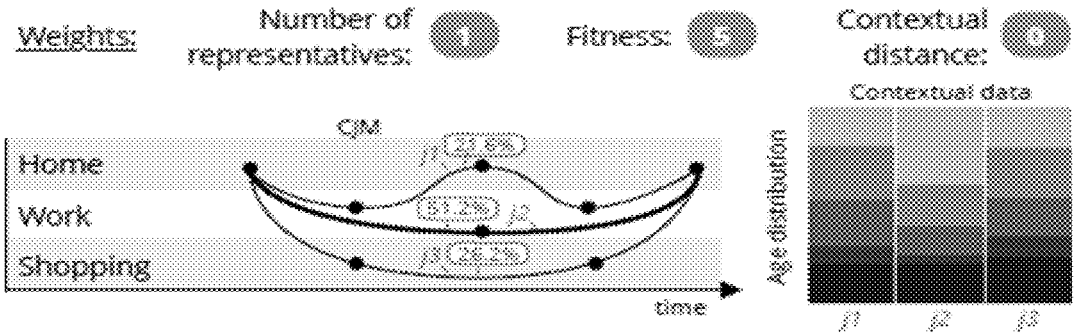
FIG. 27 shows results using different setting configurations.
Figure 27:
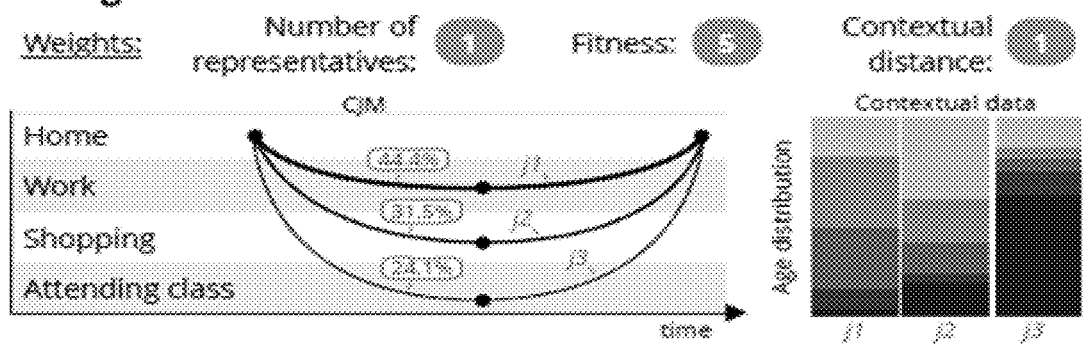
Figure 27:
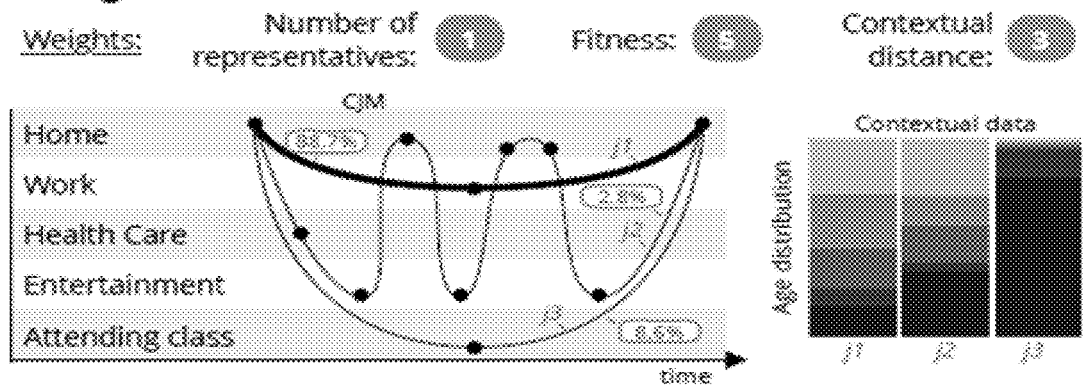

As a preprocessing step, the age of the customers can be binarized into five groups (see the legends in FIG. 27) and other contextual data can be removed. This is an example. The goal is to show the influence of the settings on the journey map. FIG. 27 shows the results using three different configurations.

In configuration 1, the contextual data is not leveraged (i.e., the contextual distance weight is set to 0). The platform 100 can interpret the resulting journey map as follows. The first journey represents people going to 'work', going back 'home' at noon, and returning to 'work' in the afternoon. The second journey is close to the first one, the main difference being that people do not seem to go back 'home' at noon. The third journey shows citizens being at 'home', going 'shopping' twice in the afternoon, and going back 'home'. Interestingly, the activity 'shopping' appears twice in a row. Note that this does not necessarily mean that the activity is repeated twice in a row; it might be that there are some other activities in between, but because they are not significant enough, they are not shown.

In configuration 2, platform 100 can test the effect on the resulting journey map when considering the ages of the customers. Therefore, we changed the weight put on the contextual distance from 0 to 1. As can be seen in FIG. 16, three representative journeys were generated. Each of these journeys has three touchpoints. They start from 'home' and finish at 'home'. In between, the first journey has the activity 'work', the second one has the activity 'shopping', and the last one the activity 'attending class'. It is interesting to note the effect of the configuration on the contextual data (the distribution charts on the right side of FIG. 16). Indeed, while the age was equally distributed for each journey in configuration 1, we can observe that the age is discriminant in configuration 2. For instance, more than half of the citizens in the journey $j_3$ are under 16 years old, while this population represents only 8.7% of the entire dataset.

In configuration 3, platform 100 can show the effect when we increase the weight put on the contextual distance parameter. Journeys $j_1$ and $j_3$ are identical to those in configuration 2. However, a new and rather complex journey $j_2$ emerges. It starts from being at 'home', goes to 'health care', and then alternates between the activities 'entertainment' and 'home'. As can be expected, the effect of the contextual data is stronger than in configuration 2. We also observe that the distribution is impacted when giving more weight to homogeneity. We interpret the result as follows: Citizens younger than 29 years old tend to have two typical patterns of activities involving either 'school' or 'entertainment' while the most typical journeys for the other citizens involve 'work'.

Of course, this is a simplified overview of the data. For the almost 30,000 actual journeys in the event logs, there are numerous unique actual journeys that differ from the representative journeys we get from these three configurations. By letting the user choose the weight for each parameter, we let them explore different perspectives of the data. We claim that the best parameters depend on the dataset, the business context, and the goal of the exploration.

The platform 100 can use different quality criteria to guide the evolution process of discovering the best representative journeys for a given set of actual journeys that otherwise would be unreadable on a display device or interface. The platform 100 can perform well on synthetic datasets and that they allow us to discover journey maps showing different alternative perspectives of the same real dataset. However, quality criteria might be created to fit a business context. Typically, the criterion simplicity might be used in addition to or to replace $k_h$. Because it is difficult to anticipate what will be the ideal number of clusters returned by $k_h$, simplicity would offer a more intelligible way to choose between a highly fitting but more complex journey map, or a less fitting but simpler journey map. Industry-driven quality criteria might be used in addition to the ones proposed.

For the contextual distance, platform 100 can limit the set of contextual data to categorical data and—in the experimentation using a real dataset—platform 100 can select one item of contextual data manually (i.e., the age). The platform 100 can also preprocess the data to distribute the age into bins (e.g., 60+ years old) to turn the continuous feature into a categorical one. Datasets can possess numerous items of contextual data of different types.

Finally, a genetic approach is one example solution to solve the customer journey discovery task.

The genetic approach to summarizing a set of customer journeys with the purpose of displaying them on a journey map offers an interesting alternative. First, the quality of the results is better, which is true using both internal and external evaluation metrics. Second, the weights of the three quality criteria are a flexible way to analyze a dataset under different perspectives. Third, in addition to the sequence of activities, our genetic algorithm can leverage contextual data to group similar journeys. By doing so, platform 100 can provide a way to summarize insights from customers that are hidden in the data.

The platform 100 can generate an interface to guide end-user in the process of making abstract traces from complex ones by leveraging the knowledge about the control-flow of activities stemmed from process models (produced by process mining discovery algorithm.

A trace or map is a conceptual tool used to visualize typical customers' trajectories when using a service. In their simplest form, maps show the interactions between a customer and a service provider through time. A series of interactions is called a journey. Because maps give a company a better understanding of their customers, they are becoming increasingly popular amongst practitioners.

A map can anticipate the best—or worst—journeys possible. Such journeys, displayed on a map, are called the expected journeys. However, customers might experience a different journey from the one anticipated. For this reason, platform 100 can leverage traces left by customers in information systems to build maps from evidence. Because the journeys that will be displayed on the map are produced from facts, they can be referred to as actual journeys.

Figure 28:
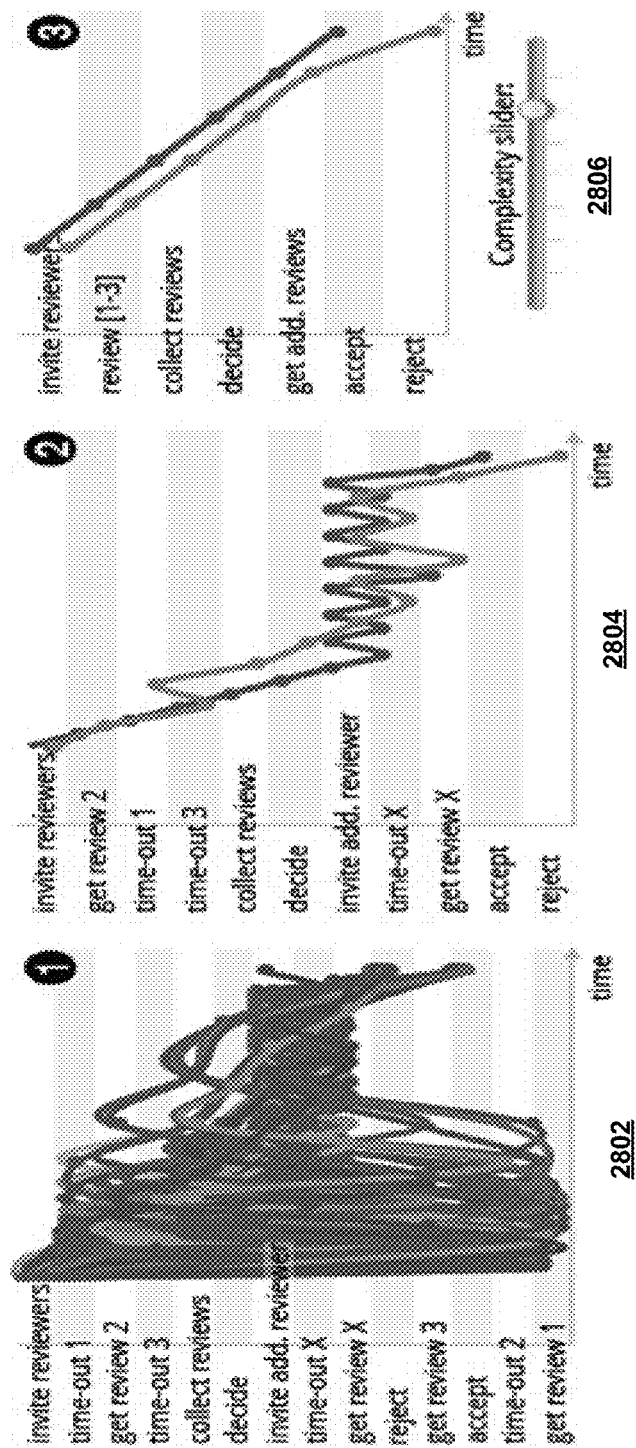
FIG. 28 depicts an example for the handling of reviews for a journal.

However, when dealing with numerous journeys, it becomes unrealistic to display all the actual journeys on a single map at interface application 130. For illustration purposes, FIG. 28 depicts 10,000 instances of the traces related to the handling of reviews for a journal, an example synthetic dataset. In the context of this dataset, the service provider is the conference's organizing committee, the customers are the researchers submitting their papers, and a journey describes the handling of the reviews, from the submission until the final decision. In FIG. 28, at 2802 it is difficult to apprehend the typical paths of the reviewing process. To this end, representative journeys have been introduced as a means of reducing the complexity. Indeed, the central map 2804 uses two representative journeys to summarize 10,000 actual journeys.

Although representative journeys decrease the complexity by reducing the number of journeys, a map might still be difficult to apprehend when it is composed of many activities. Indeed, even though only representative journeys are being used, quickly spotting the main differences between the two journeys visible in 2804 (FIG. 28) is not straightforward due to the high number of activities and the length of the journeys.

The platform 100 can implement a map abstractor that leverages the expertise of process discovery to abstract maps for visual representation. More precisely, platform 100 can take as an input a process tree, parse it, starting from the leaves, and iteratively ask the end-user if it is relevant to merge the activities that belong to the same control-flow, and, if so, to provide a name for this group of activities. By doing so, platform 100 can let the end-user decide which activities should be merged and how they should be renamed. Then, one can visualize the same maps at different levels of granularity using a slider, which is visible in FIG. 28 at 2806. At a certain level of granularity, platform 100 can enable an end user to observe, given the end activities, that one representative journey summarizes the accepted papers, while the other one depicts the rejected papers. The map abstractor can explore a seamless integration of business process models with journeys maps.

The platform 100 can implement process mining and process discovery activity. Section The platform 100 can implement customer journey discovery activity.

The platform 100 can implement integration of Process Mining with Journey Mapping and showcases the impact that the latter can have in the analysis of journeys. Process mining involving machine learning, data mining and process modeling and analysis. The platform 100 can implement the discovery of process models, one of the three types of process mining along with conformance and enhancement.

The idea behind the discovery of process models is to leverage the evidence left in information systems to build process models from event logs. The resulting process models are, therefore, based on factual data, showing how the process was really executed. To build such a model, process mining uses an input data format called event logs. An event log is a collection of traces, a trace being a single execution of a process composed of one or multiple activities.

Figure 29:
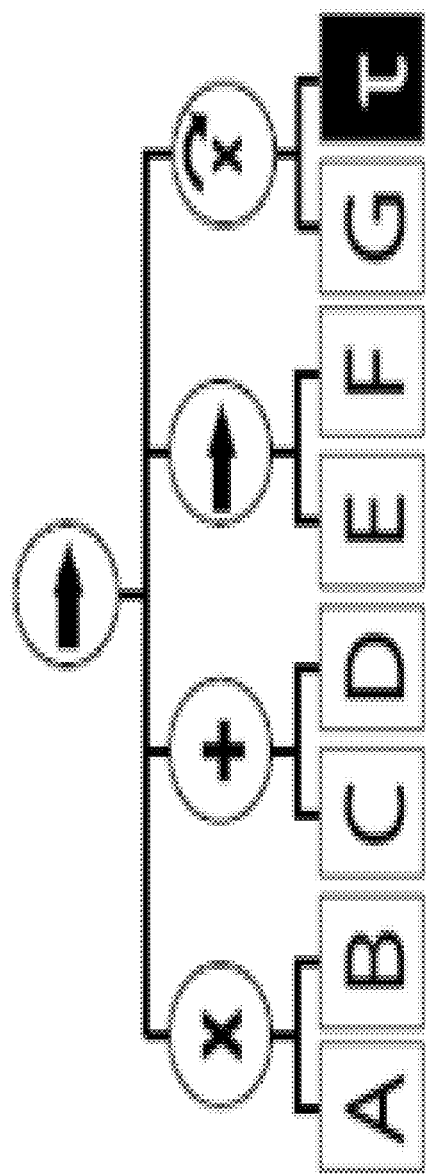
FIG. 29 displays relations using a process tree.

For illustration purposes, let T=(⟨bdcef⟩; ⟨acdefg⟩; ⟨bcdefgg⟩) be an event log composed of 3 traces and 7 distinct activities. Regardless of the notation, the resulting models can express the control-flow relations between activities. For instance, for the event log, T, the model might express the following notation: 1) A and B are in an XOR relation (X); i.e., only one of them is executed; 2) C and D are executed in parallel (+); i.e., both activities are executed in any order; 3) E and F are in a sequence relation (→); i.e., F always follows E; 5) G is in a XOR loop (Combination of X and ↻ ); i.e., it can be executed 0 or many times. Note that τ denotes a silent activity. It is used to correctly execute the process but it will not result in an activity which will be visible in the event logs. FIG. 29 displays the five aforementioned relations using a process tree.

Discovering a process model from event logs is a challenge. The platform 100 can be robust enough to generalize (to avoid overfitting models) without being too generic. The platform 100 can build process models or process trees.

A process tree is an abstract hierarchical representation of a process model, where the leaves are annotated with activities and all the other nodes are annotated with operators such as X. Process trees are a means of guaranteeing the soundness of the discovered models. A model is considered to be not sound when some activities cannot be executed or when the end of the process cannot be reached.

The soundness guarantee is one reason that we choose the process tree notation. There are also three other reasons. First, process models in block structure achieve best performance in terms of fitness, precision, and complexity. Second, the hierarchical structure of process trees is ideal to derive multiple levels of granularity. Finally, process trees can be used by top-performing process model algorithms, such as the inductive miner or the Evolutionary Tree Miner [6].

The platform 100 can use a process mining based model that allows us to map a standard event log from process mining (i.e., XES) to store customer journeys, as an attempt to bring customer journeys and process mining closer together.

Discovering a set of representative journeys that best describe the actual journeys observed in the event logs is a challenge inspired by the process discovery challenge. However, instead of describing the control flows of activities using a business process model, the main trajectories (i.e., the representative journeys) can be shown using a journey map. It encompasses example challenges: (1) choosing the number of representatives. Let k be this number of representative journeys used on a journey map; (2) grouping actual journeys in k clusters; and (3) for each k, finding a representative journey. The platform 100 can overcome them.

First, the number of representative journeys used to summarize the entire actual journeys needs to be set. Looking at 2802 from FIG. 28, it is difficult to say how many representative journeys should be used to summarize the data. The platform 100 can use different ways to find the number of representative journeys. First, the number of representative journeys can be set manually. It can also be set using standard model selection techniques such as the Bayesian Information Criterion (BIC) penalty or the Calinski-Harabasz index, for example.

Once k has been defined, actual journeys should be split in k clusters and a representative journey per cluster must be found. One of the ways, is to first define a distance function between actual journeys, such as the edit distance, or shingles, and to build a distance matrix; then, to split the actual journeys in k groups using hierarchical clustering techniques. Next, the representative can be found using a frequent sequence mining algorithm, by counting the density of sequences in the neighborhood of each candidate sequence, by taking the most frequent sequences, or by taking the medoid. Instead of inferring the representative from the distance matrix, it is also possible to obtain it using statistical modeling. The platform 100 can employ an Expectation-Maximization algorithm on a mixture of k Markov models, and then for each Markov model the journey with the highest probability becomes the representative.

Figure 30:
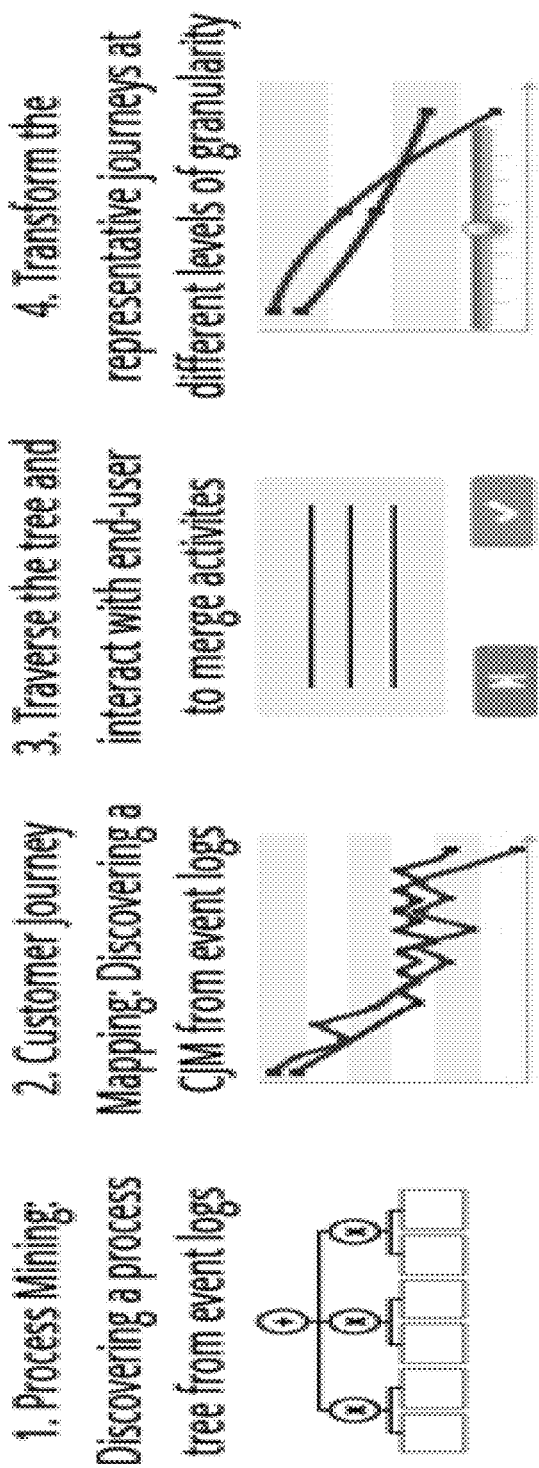
FIG. 30 depicts map abstractor steps.

The platform 100 implements map abstractor using different steps to render a map at different levels of abstraction. The steps 300 are depicted in FIG. 30. In the first step, the goal is to build a process tree given an event log. Next, using the same event log, the goal is to build a journey map.

The third step consists of parsing the tree obtained in step 1. To this aim, the platform 100 can use a script (stored in memory 108) which parses the process tree (i.e., XML file) and performs a reverse Breadth-first search; i.e., traversing the operators in the tree from the lowest ones to the root in a level-wise way. Let be the number of operators in the process tree. At each of the operators of the process tree, platform 100 offers the opportunity to the end-user to merge the leaves under the operator. If the user chooses to merge the activities, she should provide a new name and the operator virtually becomes a leaf. If the end-user chooses not to merge the activities, platform 100 can keep the leaves intact. If the answer is no, platform 100 can keep the activities separated at all levels of granularities, and we also disable the parents' steps. Indeed, platform 100 can postulate that if a user does not want to merge two activities at a low level of granularity, it does not make sense to merge them later at a higher Level of granularity.

Finally, in step 4, platform 100 can transform the journey map at different levels of abstraction. Let $\lambda$ be the number of abstractions which will be available for a journey map. It can be seen as the number of steps that will be included in the sliders visible in FIG. 28 at 2806 Note that $\lambda$ is equal to the number of times the end-user decides to merge the activities and that $\lambda=1$ when the end-user merges all the activities. Let operator $\lambda$ be the $\lambda^{th}$ operator to be merged. Let GetLevelAbstraction (journey map, $\lambda$, pt) be a function that returns a journey map at the $\lambda^{th}$ level of abstraction. Algorithm 1 shows how the function Abstract is recursively called to get to the level of abstraction $\lambda$. The parameter removeSeqRepeats in Algorithm 1 in line 7 emphasizes that continuous sequence of activities that are to be replaced, will be replaced by only one instance of the new name given for this operator. For instance, if the journey is "AABCBAC", the leaves that are to be replaced, are "A" and "B" and the new name is "X", the journey will become "XCXC". This reduces the length of the journeys and, thus, increases the abstraction. The following shows operations for getting to the level of complexity.

---

```
Input   : cjm, customer journey map
          λ, level of abstraction
          pt, process tree annotated with merging decisions
Output: cjm_λ, cjm at the level of abstraction λ
1 Function GetLevelAbstraction(cjm, λ, pt)
2  |  for i ← 0 to λ do
3  |   |  cjm → Abstract(cjm, pt.operator_i)
4  |  return cjm
5 Function Abstract(cjm, op)
6  |  foreach journey in cjm do
7  |   |  journey.replace(op.leaves, op.new_name,
              removeSeqRepeats=True )
8  |  return cjm
```
---

This section provides a running example of the tool implemented by platform 100. The running example is based on synthetic event logs describing the handling of reviews for a journal referred to here. It contains 10,000 journeys and 236,360 activities.

In the first step, we obtained a process tree by using the inductive miner with default parameters. It results in the process tree 3100 visible in FIG. 31.

In the second step, platform 100 can obtain a journey map by: (1) measuring the distance between actual journeys using the edit distance; (2) building a dendrogram using a hierarchical clustering algorithm; (3) finding k using the Calinski-Harabaz Score (k=2); (4) finding representative journeys which results in a journey map which is visible in 2804 (FIG. 28).

Figure 31:
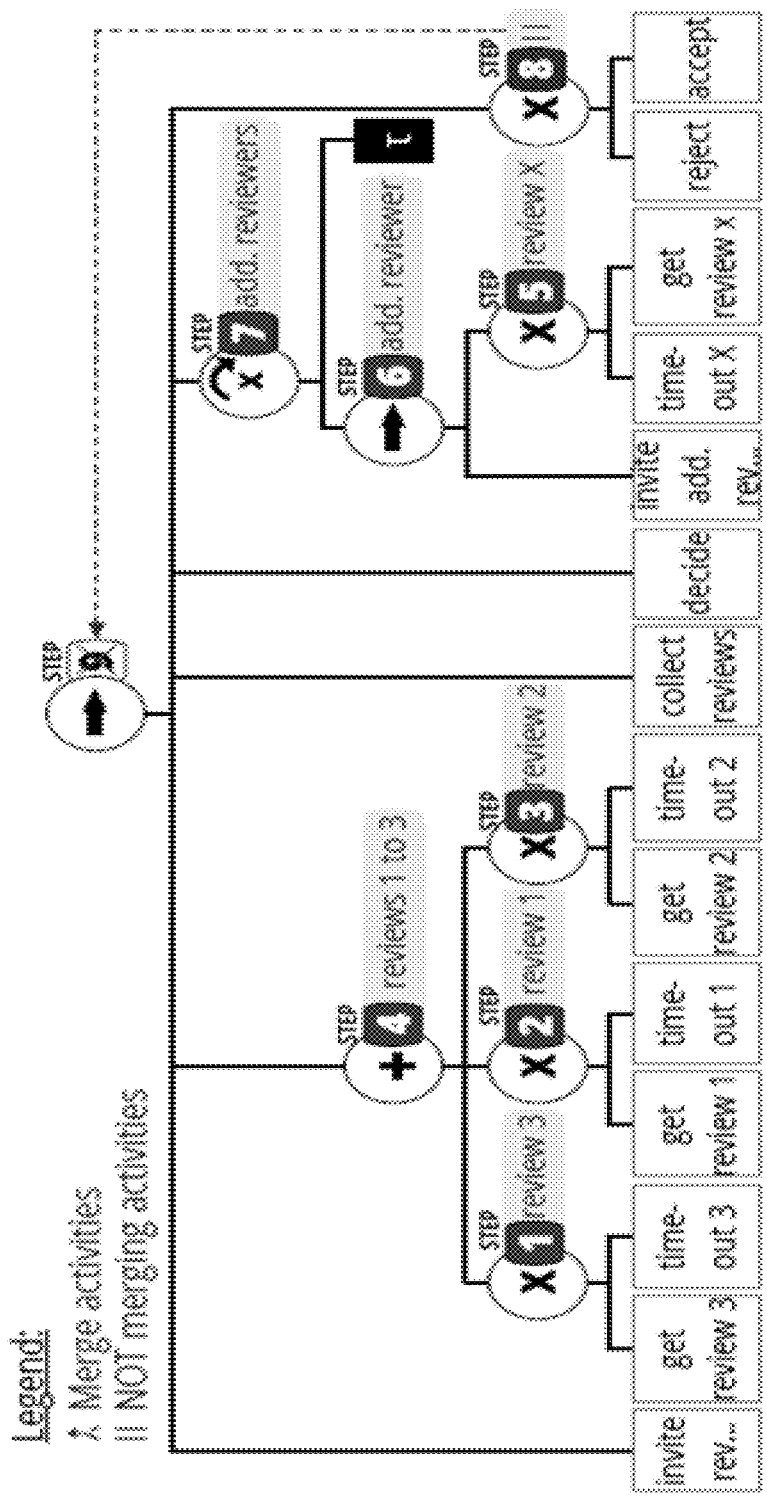
FIG. 31 depicts results of the process tree.
Figure 32:
FIG. 32 shows a screen capture of the application when merging the activities.

In the third step, platform 100 can parse the XML in javascript. To traverse the tree, platform 100 can be using a tree-like data structures. The order in which the operators are parsed is depicted in FIG. 31 (i.e., 'step'). FIG. 31 shows that we decided to merge 7 out of the 9 operators. Note that we decided not to merge the activities 'reject' and 'accept', which disabled the option of merging all the activities below step 9. FIG. 32 shows a screen capture 3200 of the application when merging the activities during step 1.

Figure 33:
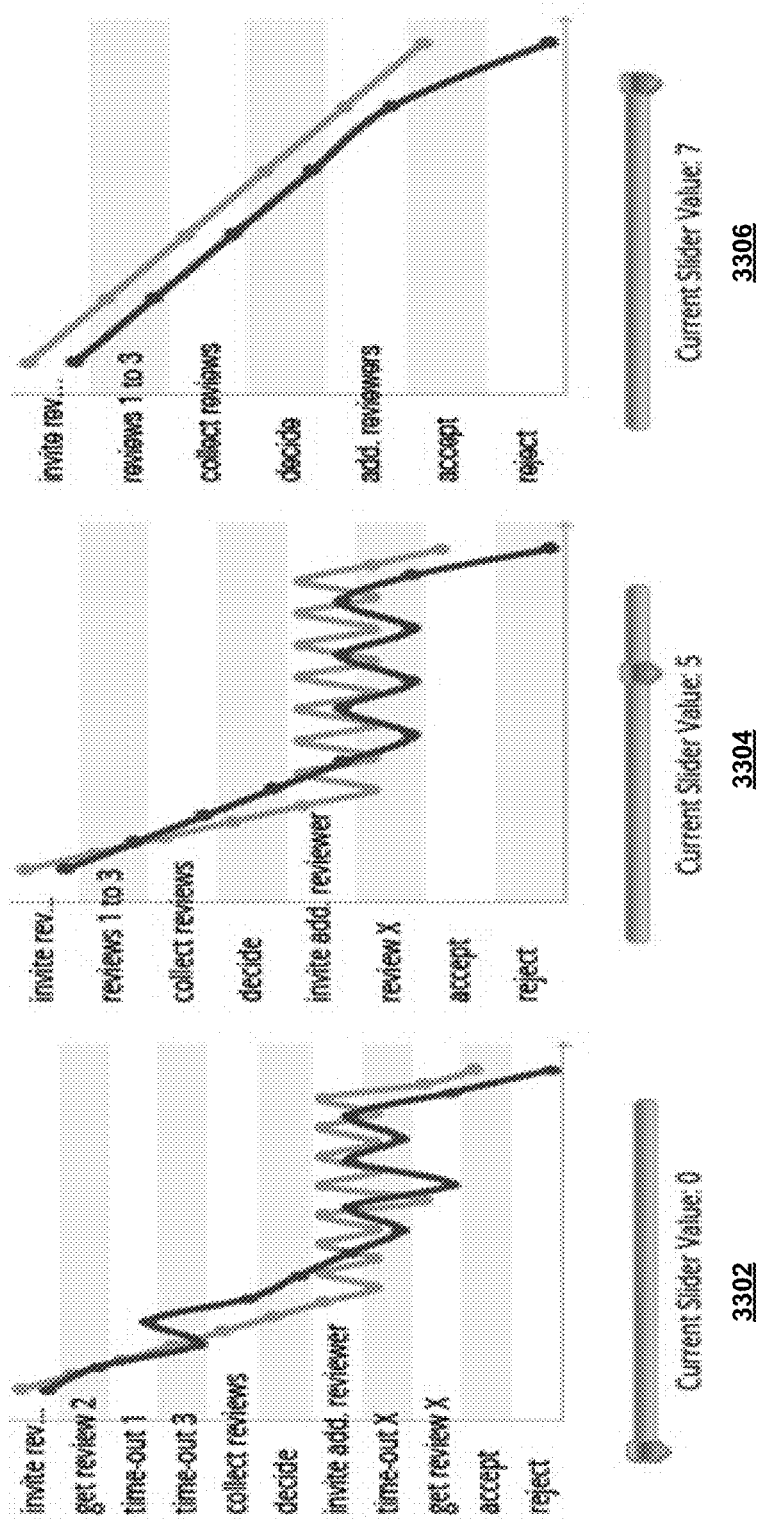
FIG. 33 shows journey maps at three levels of abstraction.

Finally, FIG. 33 shows the resulting journey maps at three levels of abstraction 3302, 3304, 3306.

Journey maps are being used more and more to help service providers put themselves in their customers' shoes. The platform 100 provides automated ways of building them and displaying complex paths on a journey map. By leveraging process trees—a format build within the process mining community—platform 100 can bring customer journey analytics and process mining closer together.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A computer system for generating and updating visual elements of an interactive user interface comprising:
   a data storage device having a data warehouse model for storing a plurality of event traces, each event trace having attributes that represent a series of sequential activities over time and one or more logical relations that represent control-flow relations between at least two activities of the series of sequential activities, the series of sequential activities of each of the plurality of event traces representing a journey map of a user;
   a processor configured to process machine executable instructions to generate visual elements for the interactive interface application by:
      generating a plurality of hierarchical clusters for the plurality of event traces by grouping event traces having similar attributes, each hierarchical cluster in the plurality of hierarchical clusters comprising a set of event traces and a representative event trace based on the similar attributes as between the event traces of the set of event traces;
      generating a set of representative attributes for a set of event traces of each of hierarchical clusters in the plurality of hierarchical clusters, the set of representative attributes computed based on the similar attributes;
      generating a pattern of activities of a selected hierarchical cluster based on the representative event trace;
      generating the visual elements for multiple views for the interface application, the multiple views having a first view indicating the pattern of activities for the set of representative attributes; a second view indicating the selected hierarchical cluster and the pattern of activities within the selected hierarchical cluster; and a third view indicating descriptors for the selected hierarchical cluster, the multiple views having a plurality of selectable portions; and
      controlling rendering of the interface application at a device to display the multiple views synchronously and simultaneously, the display indicating the plurality of selectable portions;
      responsive to a selection of a selectable portion of the plurality of selectable portions, controlling rendering of the interface application at the device to update the multiple views synchronously based on the selected portion to navigate the selected hierarchical cluster.

2. The system of claim 1 wherein the processor generates the plurality of hierarchical clusters by computing a distance measure for the attributes of the plurality of event traces to compute the similar attributes.

3. The system of claim 1 wherein the processor generates the plurality of hierarchical clusters by computing a distance measure based on a Levenshtein distance.

4. The system of claim 1 wherein the processor generates the plurality of hierarchical clusters by computing a distance between clusters of the plurality of hierarchical clusters.

5. The system of claim 1 wherein the pattern of activities indicates the set of representative attributes for a segment of a corresponding hierarchical cluster that corresponds to the set of event traces.

6. The system of claim 5, wherein the second view indicates the segment of the selected hierarchical cluster for the pattern of activities indicated in the first view.

7. The system of claim 1, wherein the selection portion is within a view of the multiple views to trigger an update to the other views of the multiple views.

8. The system of claim 1 wherein the processor updates the multiple views synchronously based on the selected portion to navigate the selected hierarchical cluster at different levels of abstraction or granularity.

9. The system of claim 1 wherein the processor generates the plurality of hierarchical clusters based on a proximity measure using an order of activities for the set of event traces.

10. The system of claim 1 wherein the processor computes salient characteristics for the descriptors to indicate indexes based on a chi-square test.

11. The system of claim 1 wherein the processor receives a navigation goal at the interface application, the goal indicating an attribute and responsive to the navigation goal, controlling rendering of the interface application at the device to update the multiple views synchronously to indicate data based on the navigation goal.

12. The system of claim 1 wherein the processor generates the plurality of hierarchical clusters based on layers, a layer comprising a number of event traces that will be grouped based on the similar attributes, the layers corresponding to a height of the selected hierarchical cluster.

13. The system of claim 1 wherein the processor generates the set of representative attributes based on the similar attributes and a frequent sequences mining process.

14. A non-transitory computer readable medium storing machine executable instructions to configure a processor to:
   generate a plurality of hierarchical clusters for a plurality of event traces by grouping event traces having similar attributes, each event trace having attributes that represent a series of sequential activities over time and one or more logical relations that represent control-flow relations between at least two activities of the series of sequential activities, the series of sequential activities of each of the plurality of event traces representing a journey map of a user;
   generate a set of representative attributes for the set of event traces of each of the hierarchical clusters in the plurality of hierarchical clusters, the set of representative attributes computed based on the similar attributes, each hierarchical cluster in the plurality of hierarchical clusters comprising a set of event traces and a representative event trace based on the similar attributes as between the event traces of the set of event traces;
   generate a pattern of activities of a selected hierarchical cluster based on the representative event trace;
   generate the visual elements for multiple views for the interface application, the multiple views having a first view indicating the pattern of activities for the set of representative attributes; a second view indicating the selected hierarchical cluster and the pattern of activities within the selected hierarchical cluster; and a third view indicating descriptors for the selected hierarchical cluster, the multiple views having a plurality of selectable portions;

control rendering of the interface application at a device to display the multiple views synchronously and simultaneously, the display indicating the plurality of selectable portions; and responsive to a selection of a selectable portion of the plurality of selectable portions, control rendering of the interface application at the device to update the multiple views synchronously based on the selected portion to navigate the selected hierarchical cluster.

15. The non-transitory computer readable medium of claim 14 wherein the machine executable instructions configure the processor to generate the plurality of hierarchical clusters by computing a distance measure for the attributes of the plurality of event traces to compute the similar attributes.

16. The non-transitory computer readable medium of claim 14 wherein the machine executable instructions configure the processor to generate the plurality of hierarchical clusters by computing a distance between clusters of the plurality of hierarchical clusters.

17. The non-transitory computer readable medium of claim 14 wherein the machine executable instructions configure the processor to update the multiple views synchronously based on the selected portion to navigate the selected hierarchical cluster at different levels of abstraction or granularity.

18. The non-transitory computer readable medium of claim 14 wherein the machine executable instructions configure the processor to receive a navigation goal at the interface application, the goal indicating an attribute and responsive to the navigation goal, controlling rendering of the interface application at the device to update the multiple views synchronously to indicate data based on the navigation goal.

19. The non-transitory computer readable medium of claim 14 wherein the machine executable instructions configure the processor to generate the plurality of hierarchical clusters based on layers, a layer comprising a number of event traces that will be grouped based on the similar attributes, the layers corresponding to a height of the hierarchical cluster.

20. A computer process to generate and update visual elements for an interactive interface application, the process comprising:

at a processor, generating a plurality of hierarchical clusters for a plurality of event traces by grouping event traces based on distance measures, each hierarchical cluster in the plurality of hierarchical clusters comprising a set of event traces and a representative event trace based on the similar attributes as between the event traces of the set of event traces, each event trace having attributes that represent a series of sequential activities over time and one or more logical relations that represent control-flow relations between at least two activities of the series of sequential activities, the plurality of event traces saved at a data storage device in communication with the processor, the series of sequential activities of each of the plurality of event traces representing a journey map of a user;

generating a set of representative attributes for a set of event traces of each hierarchical cluster in the plurality of hierarchical clusters, the set of representative attributes computed based on the grouped event traces;

generating a pattern of activities of a selected hierarchical cluster based on the representative event trace;

generating the visual elements for multiple views for the interface application, the multiple views having a first view indicating the pattern of activities for the set of representative attributes; a second view indicating the selected hierarchical cluster and the pattern of activities within the selected hierarchical cluster; and a third view indicating descriptors for the selected hierarchical cluster, the multiple views having a plurality of selectable portions;

controlling rendering of the interface application at a device to display the multiple views synchronously; and responsive to a selection of a selectable portion of the plurality of selectable portions, controlling rendering of the interface application at the device to update the multiple views synchronously based on the selected portion, wherein the selection portion is within a view of the multiple views to trigger an update to the other views of the multiple views.

\* \* \* \* \*